US012732659B2

(12) United States Patent
Kurzynski et al.

(10) Patent No.: US 12,732,659 B2
(45) Date of Patent: Sep. 8, 2026

(54) METHODS, ARTICLES OF MANUFACTURE, AND APPARATUS TO ADJUST TUNING EVENTS

(71) Applicant: The Nielsen Company (US), LLC, New York, NY (US)

(72) Inventors: David J. Kurzynski, Elgin, IL (US); Arijit Jha, Chicago, IL (US); Michael Grotelueschen, Chicago, IL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 19/023,659

(22) Filed: Jan. 16, 2025

(65) Prior Publication Data

US 2025/0260867 A1 Aug. 14, 2025

Related U.S. Application Data

(63) Continuation of application No. 17/896,858, filed on Aug. 26, 2022, now Pat. No. 12,244,889.

(60) Provisional application No. 63/300,628, filed on Jan. 18, 2022.

(51) Int. Cl.

| | |
|---|---|
| ***H04N 21/218*** | (2011.01) |
| ***H04N 21/234*** | (2011.01) |
| ***H04N 21/24*** | (2011.01) |
| ***H04N 21/25*** | (2011.01) |
| ***H04N 21/258*** | (2011.01) |
| ***H04N 21/41*** | (2011.01) |
| ***H04N 21/439*** | (2011.01) |
| ***H04N 21/442*** | (2011.01) |
| ***H04N 21/475*** | (2011.01) |

(52) U.S. Cl.
CPC ............................ *H04N 21/44204* (2013.01)

(58) Field of Classification Search
None
See application file for complete search history.

(56) References Cited

U.S. PATENT DOCUMENTS

| | | | | |
|---|---|---|---|---|
| 2017/0302997 | A1* | 10/2017 | Brown | H04N 21/44218 |
| 2021/0037286 | A1* | 2/2021 | Conklin | H04N 21/6582 |
| 2021/0392389 | A1* | 12/2021 | Dixon | H04N 21/6582 |
| 2022/0303618 | A1* | 9/2022 | Whitely | H04N 21/6582 |

* cited by examiner

*Primary Examiner* — Brian T Pendleton
*Assistant Examiner* — Jean D Saint Cyr

(57) ABSTRACT

Methods, apparatus, systems, and articles of manufacture are disclosed for adjusting a tuning event. Examples disclosed herein include determining an initial adjustment factor for a group of stations and a combination of metadata categories associated with panel data and census data. Examples disclosed herein further include determining a final adjustment factor for the group of stations based on the initial adjustment factor and a bias correction factor. Example disclosed herein further include adjusting weighted minutes of the tuning event based on the final adjustment factor, the tuning event corresponding to the group of stations and the combination of metadata categories, the adjusted tuning event to be credited to media.

20 Claims, 12 Drawing Sheets

300

302

| Station Group | Metadata Categories | | |
|---|---|---|---|
| | Demo | Genre | Daypart |
| FIRST STATION GROUP | Households | 101 | Total Day |
| SECOND STAION GROUP | Households | 101 | Total Day |
| THIRD STATION GROUP | Households | 101 | Total Day |

304

| Station Group | Panel Weighted Minutes | | | | | |
|---|---|---|---|---|---|---|
| | Total Minutes | Restricted Device Group | Unrestricted Device Group | Alternate Monitoring Device Group | Denominator | Initial Factor |
| FIRST STATION GROUP | 543,713,932 | 74,369,419 | 464,035,755 | 5,308,758 | 469,344,513 | 1.158454 |
| SECOND STAION GROUP | 444,730,096 | 61,906,373 | 375,917,350 | 6,906,373 | 382,823,723 | 1.161710 |
| THIRD STATION GROUP | 3,065,653 | 76,550 | 1,885,296 | 1,103,807 | 2,989,103 | 1.025610 |

306

| Station Group | Census/Panel Weighted Minutes | | | Final Adjustment Factor |
|---|---|---|---|---|
| | Restricted Device Group in Region | Total Minutes in Region | Bias Correction Factor | |
| FIRST STATION GROUP | 7,436,941 | 500,000,000 | 0.985126 | 1.141223 |
| SECOND STAION GROUP | 6,190,637 | 400,000,000 | 0.984523 | 1.143731 |
| THIRD STATION GROUP | 7,655 | 2,000,000 | 0.996173 | 1.021684 |

| Station Group | Metadata Categories | | |
|---|---|---|---|
| | Demo | Genre | Daypart |
| FIRST STATION GROUP | Households | 101 | 8p-11p |
| SECOND STAION GROUP | Households | 101 | 8p-11p |
| THIRD STATION GROUP | Households | 101 | 8p-11p |
| FOURTH STATION GROUP | Households | 101 | 8p-11p |

404

| Station Group | Panel Weighted Minutes | | | | |
|---|---|---|---|---|---|
| | Total Minutes | Restricted Device Group | Unrestricted Device Group | Denominator | Initial Factor |
| FIRST STATION GROUP | 538,405,174 | 74,369,419 | 464,035,755 | 464,035,755 | 1.160267 |
| SECOND STAION GROUP | 437,823,723 | 61,906,373 | 375,917,350 | 375,917,350 | 1.164681 |
| THIRD STATION GROUP | 1,961,846 | 76,550 | 1,885,296 | 1,885,296 | 1.040604 |
| FOURTH STATION GROUP | 645,248,751 | 89,156,748 | 556,092,003 | 556,092,003 | 1.160327 |

406

| Station Group | Census/Panel Weighted Minutes | | | Final Adjustment Factor |
|---|---|---|---|---|
| | Restricted Device Group in Region | Total Minutes in Region | Bias Correction Factor | |
| FIRST STATION GROUP | 7,436,941 | 500,000,000 | 0.985126 | 1.143009 |
| SECOND STAION GROUP | 6,190,637 | 400,000,000 | 0.984523 | 1.146656 |
| THIRD STATION GROUP | 7,655 | 2,000,000 | 0.996173 | 1.036621 |
| FOURTH STATION GROUP | 8,915,675 | 600,000,000 | 0.985141 | 1.143085 |

FIG. 4

METHODS, ARTICLES OF MANUFACTURE, AND APPARATUS TO ADJUST TUNING EVENTS

CROSS-REFERENCE TO RELATED APPLICATIONS

This disclosure is a continuation of U.S. patent application Ser. No. 17/896,858, filed Aug. 26, 2022, now issued as U.S. Pat. No. 12,244,889, which claims the benefit of U.S. Provisional Patent Application No. 63/300,628, filed on Jan. 18, 2022, each of which is hereby incorporated by reference in its entirety.

FIELD OF THE DISCLOSURE

This disclosure relates generally to audience measurement and, more particularly, to methods, articles of manufacture, and apparatus to adjust tuning events.

BACKGROUND

In recent years, audiences of digital media have extensive options of media (e.g., shows, films, news, online videos, etc.) to access using numerous sources (e.g., cable, over the air (OTA), smart televisions (TVs), digital streaming devices, alternate delivery systems (ADS), such as satellite, etc.). Tuning data (e.g., minutes viewed, content title, genre, daypart, demographic, device type, etc.) is collected to gather insights on audiences accessing and/or exposed to the media. Such tuning data can include panel data and/or census data. Panel data is monitored and measured (e.g., via surveys, metering devices, sensors, background applications, etc.) for a panel of households and/or members to better understand characteristics of audiences that view/access particular television stations or over the top (OTT) streaming services. The panel includes a subset of a population with varying demographics to represent the larger population. The panel data can inform which panel members of the panel household are using a presentation device at a given time. Census data is collected in the form of automated content recognition (ACR) data or alternate data (e.g., return path data (RPD), survey data, etc.) to complement the panel data. Census data can represent a much larger segment of the population (or the population in its entirety) than the panel and includes information related to specific media viewed/accessed, content metadata, engagement (e.g., number of viewing minutes) of the audience member(s), etc. RPD can be gathered via a set-top box (e.g., a cable or satellite box). ACR data can be gathered via ACR circuitry integrated with or connected to smart TVs (e.g., Vizio®) and/or hardware digital media devices (e.g., Roku®).

BRIEF DESCRIPTION OF THE DRAWINGS

FIG. 3 is an illustration of an example first table to structure data of an example tuning event adjustment system.

FIG. 4 is an illustration of an example second table to structure data of an example tuning event adjustment system.

Figure 1:
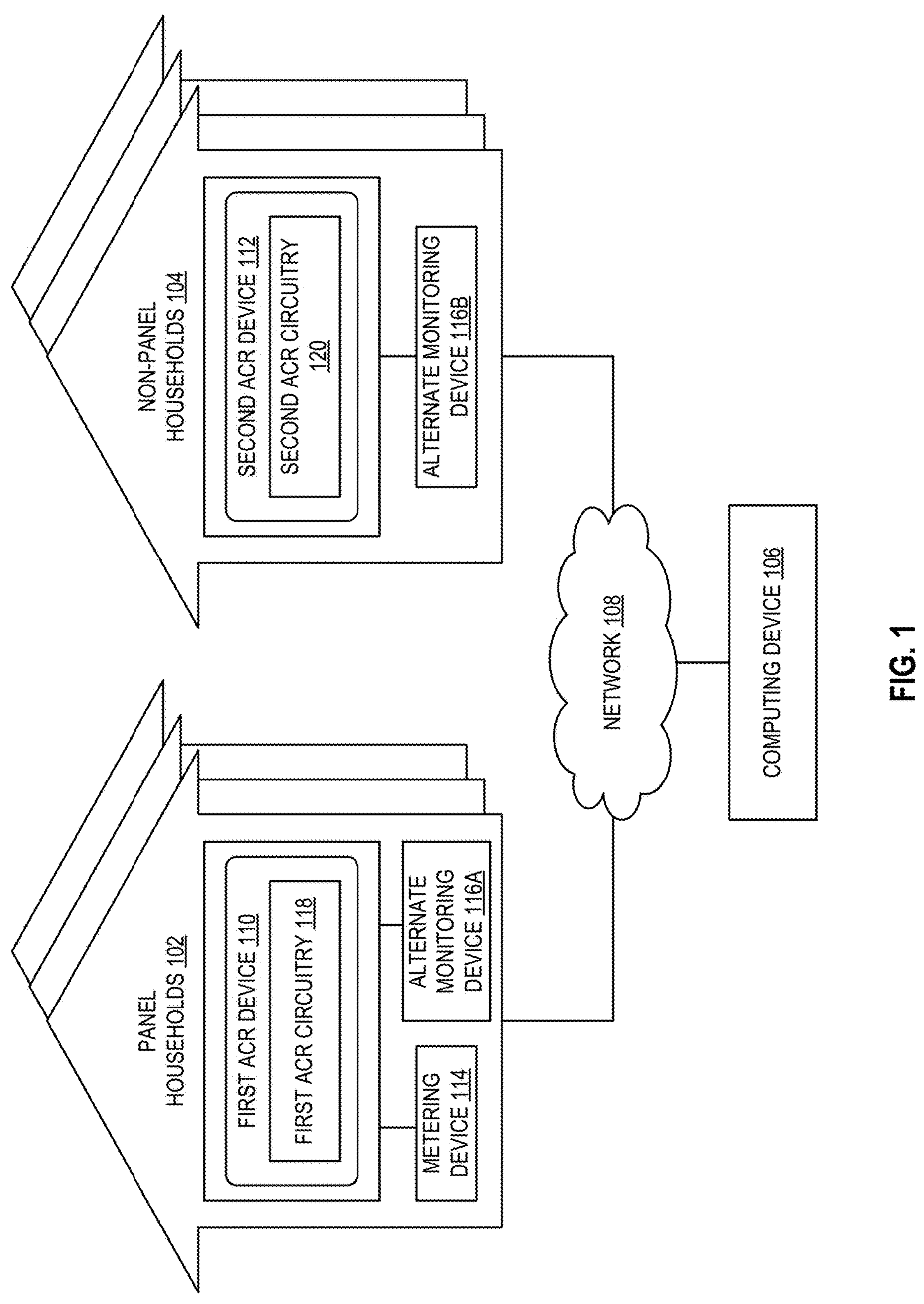
FIG. 1 is a block diagram of an example audience data collection system.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time +/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

The combined use of panel data and census data can provide a comprehensive view of audience tuning and engagement more so than either of the two in isolation. Panel data can include who is viewing/exposed to presented content, who is controlling a presentation device, a number of minutes viewed during a given daypart (e.g., date and timeframe), etc. Census data (e.g., ACR data) can provide information corresponding to tuning events, such as the number of viewing minutes, a number of credited minutes, content metadata, etc. As used herein, the term "tuning event" refers to presentation of a content source (e.g., smart TV, digital media player, cable, etc.) between any remote activity (e.g., channel change, play, pause, etc.) excluding volume adjustment. As used herein, the term "weighted minutes" refers to viewing minutes or tuning minutes that have been adjusted to reflect the representation of the viewing audience within the larger population. For example, household A includes demographic B and views station C for 60 unweighted minutes. However, household A may be credited with 2500 weighted minutes corresponding to station C based on the size of the panel, the size of the population, and/or the representation of demographic B in the population.

Some ACR circuitry in panel households are restricted and do not collect ACR data for some stations based on agreements or contracts between network/content providers and original equipment manufacturers (OEMs) of presentation devices (e.g., smart TVs) with integrated ACR technology. For example, an unrestricted ACR device (e.g., a Vizio® smart TV) may be authorized to collect ACR data for a first group of stations, but a restricted ACR device (e.g., a Roku® streaming device) may not be authorized to collect ACR data for the first group of stations. Since the restricted ACR device does not monitor the station via ACR, the census data collected for that group of stations is incomplete, and a computing device cannot accurately credit tuning events to that station and/or media presented on that station. Furthermore, since the restricted ACR device does not collect ACR data for first group of stations, the audience of the station is underrepresented. Thus, when the census data is combined with the panel data corresponding to the first group of stations, the credited weighted minutes will be less than the actual weighted minutes. When the weighted minutes of a tuning event are not fully representative of audience viewing behaviors, the computing device (e.g., server(s), back office computing facility, data processing center, cloud computing center, etc.) can spend processing time and power incorrectly and/or incompletely crediting weighted minutes corresponding to group(s) of stations. Thus, computing devices can be more efficiently utilized when the ACR data collected and/or processed accurately reflects the actual weighted minutes of tuning events.

The examples disclosed herein include systems, methods, apparatus, and articles of manufacture to adjust weighted minutes of tuning events to account for restricted ACR devices that, although include ACR technology, do not monitor one or more stations using ACR for one or more reasons. Some examples disclosed herein adjust weighted minutes of tuning events in response to determining that one or more data sources (e.g., Vizio® smart TVs, Roku® digital media devices, etc.) do not collect ACR data for a station of the tuning event. In examples disclosed herein, panel weighted minutes are obtained from panel households via metering devices (e.g., integrated circuitry, external hardware, etc.) and can be used to determine an initial adjustment factor. The panel and census weighted minutes can correspond to different combinations of metadata categories. In some examples, the combination of metadata categories includes a daypart, a station genre, and a demographic. As used herein, the term "daypart" refers to a time of day when the station was viewed/accessed/tuned and when the weighted minutes occurred (e.g., 6:30 pm-7:00 μm, 7:00 pm-8:00 μm, 8:00 pm-10:00 pm, etc.). As used herein, the term "station genre" refers to a classification of the station associated with the weighted minutes (e.g., CW Broadcast®, ABC®, Streaming (5005), etc.). As used herein, the term "demographic" refers to characteristics of the person or persons tuning to the station and playing the station for the duration of the weighted minutes (e.g., households, Persons 12-17, Females 18-34, Males 55+, etc.).

In examples disclosed herein, the computing device obtains the weighted minutes (e.g., panel weighted minutes and census weighted minutes) from ACR devices for a configurable number of days associated with a combination of metadata categories, such as one week's worth of weighted minutes corresponding to a station genre of "101", a demographic of "households", and a daypart of "all day." The computing device separates the weighted minutes into live viewing minutes and time-shifted viewing (TSV) minutes and determines different adjustment factors based on whether the weighted minutes correspond to live viewing or TSV. The computing device categorizes the weighted minutes into station groups based on which ACR devices can monitor associated stations using ACR. For example, live viewing station groups and TSV station groups can include (i) panel weighted minutes corresponding to stations of a first station group that the ACR devices cannot monitor via ACR, (ii) panel weighted minutes corresponding to stations of a second station group that a portion of ACR devices can monitor via ACR, and (iii) panel weighted minutes corresponding to stations of a third station group that a different portion of ACR devices can monitor via ACR. In some examples, TSV station groups can also include panel weighted minutes corresponding to stations of a fourth station group that both portions of ACR devices can monitor via ACR. In some examples, a first type of ACR device (e.g., Vizio® smart TVs) can monitor the second station group via ACR, a second type of ACR device (e.g., Roku® smart TVs) can monitor the third station group via ACR, and both the first and second types of ACR devices can monitor the fourth station group via ACR. In some examples, there are more than four station groups and/or more than two types of ACR devices that can apply to examples disclosed herein.

In addition to categorizing the weighted minutes into station groups, the computing device can further partition the weighted minutes into restricted, unrestricted, and alternate monitoring device groups. The restricted device group includes panel weighted minutes obtained from ACR devices (e.g., restricted ACR devices) that cannot monitor the station group via ACR. For example, the restricted device group includes panel weighted minutes obtained from metering devices connected to the restricted ACR devices. The unrestricted device group includes panel weighted minutes obtained from ACR devices (e.g., unrestricted ACR devices) that can monitor the station group via ACR. For example, the unrestricted device group includes panel weighted minutes obtained from unrestricted ACR devices via ACR and/or from metering devices connected thereto. The alternate monitoring device group includes panel weighted minutes obtained from alternate monitoring devices (e.g., RPD devices such as set-top boxes, surveying devices and/or circuitry, etc.) connected to the restricted or unrestricted ACR devices. In some examples, the alternate monitoring device group can include live viewing weighted minutes but not TSV. When the weighted minutes are categorized and partitioned, the computing device determines initial adjustment factors for each station group of the combination of categories. For example, three adjustment factors corresponding to the first, second, and third station groups are determined for live viewing weighted minutes of a combination of metadata categories.

In examples disclosed herein, the computing device determines the initial adjustment factor based on panel weighted minutes collected via the ACR devices via panel sources and/or alternate monitoring sources. The initial adjustment factor for a live viewing station group is a ratio of the total panel weighted minutes to a sum of the panel weighted minutes in the unrestricted device group and the alternate monitoring device group. The initial adjustment factor for a TSV station group is a ratio of the total panel weighted minutes to the panel weighted minutes in the unrestricted device groups. However, the initial adjustment factor cannot be applied to the panel weighted minutes and census weighted minutes of tuning events because the result would essentially overstate the audience. In other words, applying an initial adjustment factor to corresponding tuning events (e.g., tuning events of the same station group and combination of metadata categories) would result in a higher number of credited weighted minutes than what was actually viewed by the audience because some of the panel weighted minutes would still be obtained from restricted ACR devices via metering devices/circuitry. Therefore, a bias correction factor is determined to account for the restricted ACR devices in panel households that can collect panel weighted minutes of the tuning events. The initial adjustment factor is combined with (e.g., multiplied by) the bias correction factor to determine a final adjustment factor that is applied to the weighted minutes of the tuning events.

In some examples, the final adjustment factor corresponds to a total population area from which tuning data is obtained. In some examples, the final adjustment factor corresponds to a footprint region (e.g., a portion) of the population area from which tuning data is obtained. When the final adjustment factor corresponds to the total population area, the bias correction factor is calculated as one minus the ratio of the panel weighted minutes in the restricted device group to panel and census weighted minutes corresponding to ACR and non-ACR devices (e.g., metering devices, ACR circuitry, alternate monitoring devices/circuitry, etc.) in the total population area. When the final adjustment factor corresponds to the footprint region of the population area, the bias correction factor is calculated as one minus the ratio of a portion (corresponding to the footprint region) of the panel weighted minutes in the restricted device group to panel and census weighted minutes from ACR and non-ACR devices in the footprint region.

A plurality of final adjustment factors are determined for live viewing or TSV and for each combination of metadata categories (e.g., station genre, daypart, demographic, etc.) and each station group. One of the final adjustment factors can be applied to (e.g., multiplied by) the weighted minutes of a tuning event that corresponds to the same combination of metadata categories and same station group as the final adjustment factor. This results in adjusted tuning events with credited weighted minutes that more appropriately represents the viewing/accessing of stations that otherwise would not be measured by panel households with restricted ACR devices.

In examples disclosed herein, the computing device can adjust the tuning events to reflect audience viewing/accessing behaviors more accurately for advertising and ratings insights. The example computing device spends less processing time and power parsing through tuning events with insufficient panel and/or census data and determining whether and/or how to combine the census and panel data of the tuning event. In some examples, tuning events with incomplete data are not sufficiently measurable and may be discarded. In some examples, the tuning events may be stored but are still not sufficiently usable. Thus, the examples disclosed herein teach methods, apparatus, systems, and articles of manufacture to adjust tuning events and to reduce the amount of unmeasurable tuning events that are discarded, save storage space by not saving insufficient tuning events, and save processing time and power by not combining data of unadjusted tuning events that are ultimately not used.

Referring to FIG. 1, an illustrated block diagram shows an example system 100 for collecting weighted minutes and tuning events from different households. The example system 100 includes example panel households 102 and example non-panel households 104 connected to an example computing device 106 via an example network 108. The example network 108 can be a wired connection (e.g., a coaxial, a fiber optic, etc.) or a wireless connection (e.g., a local area network, a wide area network, etc.) to communicate data to the computing device 106. The example computing device 106 can be a back office computing facility or another type of audience measurement computing system to credit tuning events and ingest, measure, adjust, and/or analyze tuning data. The example computing device 106 is described in greater detail below in reference to FIG. 2.

As illustrated in FIG. 1, the example panel households 102 can include one or more first ACR devices 110 (e.g., the first type of ACR devices previously mentioned) that may be restricted or unrestricted ACR devices depending on the station and station group being presented on the first ACR device 110. The example non-panel households 104 can include one or more second ACR devices 112 (e.g., second type of ACR devices previously mentioned) that may also be restricted or unrestricted ACR devices depending on the station and associated station group being presented on the second ACR device 112. In some examples, the first ACR device(s) 110 is/are included in the non-panel households 104 either in place of or in addition to the second ACR device 112. In some examples, the second ACR device(s) 112 is/are included in the panel households 102 either in place of or in addition to the first ACR device 110. In some examples, first and/or second ACR devices 110, 112 are smart TV devices (e.g., Vizio® smart TVs) that can stream media via the network 108 and/or non-smart TV devices that can stream media via the network 108 with a digital streaming meter device (e.g., Roku® device). In some examples, the first and/or second ACR devices 110, 112 are non-smart TVs connected to cable services or satellite dish services via one or more set-top boxes. Although one panel household 102 and one non-panel household 104 are illustrated in FIG. 1 and described herein, a plurality of panel and non-panel households 102, 104 can be in communication with the computing device 106 via one or more networks 108. Although the panel and non-panel households 102, 104 are illustrated in FIG. 1, other panel or non-panel households with different types of ACR devices, such as smart TVs (e.g., LG®, Samsung®, Insignia®, etc.) and/or digital media streaming devices (e.g., Amazon Fire TV®, Apple TV®, Google TV®, etc.), can be in communication with the computing device 106.

The example first and second ACR devices 110, 112 can include media monitoring devices and/or circuitry integrated directly with output devices (e.g., display screens, speakers, etc.). In some examples, the first and second ACR devices 110, 112 include media monitoring devices and/or circuitry connected externally to output devices such as a display screen, speakers, a non-smart TV, etc. Although one of each first and second ACR devices 110, 112 are illustrated in FIG. 1, there can be multiple first and/or second ACR devices 110, 112 included in the panel and/or non-panel households 102, 104 that measure tuning data of audiences and transmit the tuning data to the computing device 106 via the network 108.

The example system 100 illustrated in FIG. 1 includes an example metering device 114 to monitor tuning events occurring on the first ACR device 110 in the panel households 102. The example metering device 114 can be circuitry integrated into the example first ACR device 110. Additionally or alternatively, the example metering devices 114 can be external device(s) connected to the first ACR device 110 via a wired or wireless connection, and/or otherwise structured to monitor the first ACR device 110 noninvasively (e.g., via one or more microphones and/or cameras to sense/collect audio and/or video output from the first ACR device 110). The example metering device 114 can detect which audience member(s) are viewing the presented media, when an input is detected (e.g., a play/pause input via a remote control device), what station is being viewed, and for how long the tuning event occurs. The example metering device 114 can execute panel monitoring applications that prompt a panel member or user to input a command confirming an identity of the panel member. In some examples, the metering device 114 can automatically detect when content is being viewed, who is viewing the content, and for how long the content is viewed using facial recognition, thermal imaging, audio sensors, etc.

The example system 100 illustrated in FIG. 1 includes an example alternate monitoring devices 116A-B to collect tuning data (e.g., weighted minutes) occurring on the example first and/or second ACR devices 110, 112. The example alternate monitoring devices 116A-B can be a set-top-box externally connected to the first and second ACR devices 110, 112 to access and present media from broadcast stations via coaxial cable or satellite dish networks. In some examples, the alternate monitoring devices 116A-B collect tuning data (e.g., census weighted minutes and metadata) similar to the tuning data captured by the first and second ACR devices 110, 112 but using different methods. For example, the alternate monitoring devices 116A-B can detect remote activity (e.g., channel change, play, pause, etc.), detect metadata (e.g., content title, station code, station genre, etc.) corresponding to the content being played as a result of the remote activity, measure how long the content is presented until the next remote activity, etc. Although the example panel and non-panel households 102, 104 illustrated in FIG. 1 include the example alternate monitoring devices 116A-B, some panel and non-panel households 102, 104 (shown and/or not shown in FIG. 1) may or may not include the alternate monitoring device(s) 116A-B and thus may or may not provide alternate monitoring data to the computing device 106. In some examples, when the panel and/or non-panel households 102, 104 include the alternate monitoring device 116A or 116B, the household does not also collect ACR data.

The example system 100 illustrated in FIG. 1 includes example first ACR circuitry 118 and example second ACR circuitry 120 to automatically recognize content being presented on screen and to collect tuning data (e.g., weighted minutes, metadata, etc.) corresponding to the presented content. The example first and second ACR circuitry 118, 120 of the illustrated example FIG. 1 can automatically detect watermarks and/or fingerprints in the presented media to determine what content is being viewed and for how many minutes. In some examples, the first and second ACR circuitry 118, 120 are integrated into the respective first and second ACR devices 110, 112. In other examples, the first and second ACR circuitry 118, 120 are external devices that are connected to the respective first and second ACR devices 110, 112. The example first and second ACR circuitry 118, 120 can execute ACR applications on the first and second ACR devices 110, 112 or and/or execute ACR software in the operating systems of the first and second ACR devices 110, 112. Although the example illustration of FIG. 1 shows the first and second ACR circuitry 118, 120 integrated into respective ones of the first and second ACR devices 110, 112, the first ACR circuitry 118 can be connected to the second ACR device 112 and/or the second ACR circuitry 120 can be connected to the first ACR device 110.

As used to herein, the first ACR device 110 refers to a type of ACR device (e.g., the first type of ACR device) that is restricted from monitoring the first and third station groups via ACR. As used herein, the second ACR device 112 refers to a type of ACR device (e.g., the second type of ACR device) that is restricted from monitoring the first and second station groups via ACR. As mentioned previously, although examples described herein are in reference to first and second ACR devices 110, 112 that may be restricted/unrestricted from monitoring the first, second, third, and/or fourth station groups via ACR, the examples described herein can apply to a plurality of ACR devices that are restricted and/or unrestricted from monitoring a plurality of station groups via ACR.

In some examples, the first ACR circuitry 118 is more prevalently installed in panel households and is a first original equipment manufacturer integrated circuit (IC) (e.g., an Inscape® ACR IC). In some examples, the second ACR circuitry 120 is less prevalently installed in panel households, includes fewer monitoring restrictions (relative to the first ACR circuitry 118), and is a second original equipment manufacturer IC (e.g., a Nielsen Gracenote® ACR IC). In some examples, the first and/or second ACR circuitry 118, 120 can capture ACR data via visual and/or aural detection methods. In some examples, when network providers place ACR restrictions on the first and/or second ACR devices 110, 112, the restrictions inhibit the first and/or second ACR circuitry 118, 120 from collecting ACR using a specific detection method (e.g., visual and/or aural recognition).

Figure 2:
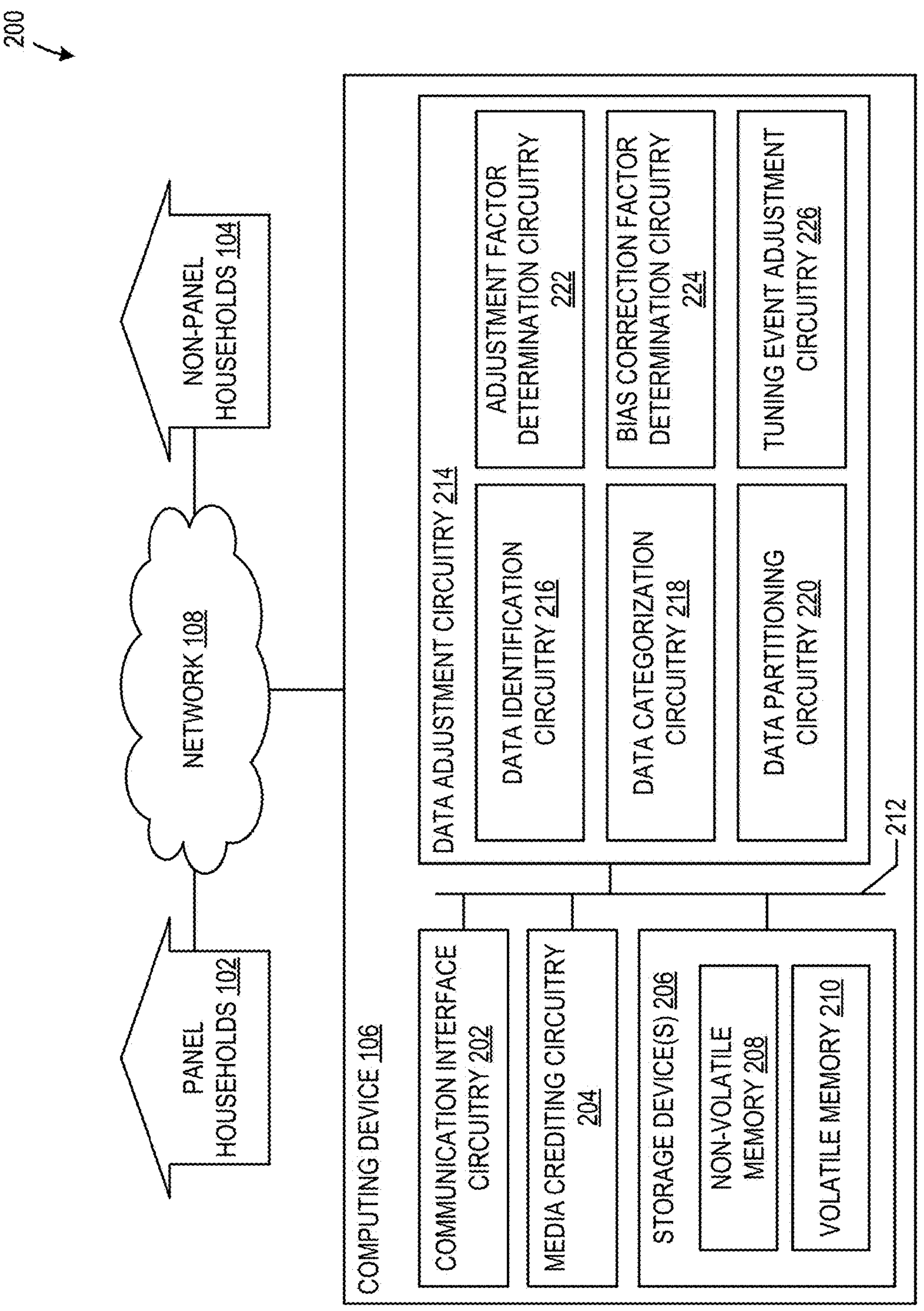
FIG. 2 is a block diagram of an example tuning event adjustment system.

FIG. 2 is a block diagram of a system 200 to determine a plurality of adjustment factors corresponding to different combinations of metadata categories and station groups. The example system 200 can apply (e.g., multiply) a final adjustment factor to weighted minutes of tuning events to account for ACR data that is not collected for particular station groups by one or more types of ACR devices. The example system 200 adjusts the tuning event with the final adjustment factor that corresponds to the same combination of metadata categories and station group as the tuning event. The example computing device 106 of FIG. 2 may be instantiated (e.g., creating an instance of, bring into being for any length of time, materialize, implement, etc.) by processor circuitry such as a central processing unit executing instructions. Additionally or alternatively, the computing device 106 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

The example system 200 illustrated in FIG. 2 includes the example computing device 106 in communication with the panel and non-panel households 102, 104 of FIG. 1 via the example network 108. The example computing device 106 includes example communication interface circuitry 202, example media crediting circuitry 204, example storage device(s) 206, such as example non-volatile memory 208 and example volatile memory 210, an example bus 212, example data adjustment circuitry 214, example data identification circuitry 216, example data categorization circuitry 218, example data partitioning circuitry 220, example adjustment factor determination circuitry 222, example bias correction factor determination circuitry 224, and example tuning event adjustment circuitry 226. The example computing device 106 can be an external server, supercomputing device, cloud data center, and/or back office computing facility to determine a plurality of adjustment factors corresponding to different combinations of categories (e.g., daypart, station genre, and demographic) and station groups (e.g., first, second, third, or fourth station groups mentioned above) and to apply the adjustment factor to tuning events corresponding to the same combination of metadata categories and station group. The example media crediting circuitry 204 of the example computing device 106 can then credit media to tuning events that do not misrepresent the audience and can perform data analysis and analytics on the adjusted tuning event more efficiently than on an unadjusted tuning event. Since the adjusted tuning events more accurately represent audience viewing, there is less processing time and power spent parsing through inaccurate or unusable tuning events. Further, less memory space is spent saving inaccurate tuning events that are not to be used for audience measurements. The example media crediting circuitry 204 can combine tuning data (e.g., weighted minutes, panel demographics, content metadata, etc.) from panel sources (e.g., metering device 114) and census data sources (e.g., first and second ACR circuitry 118, 120 and/or alternate monitoring devices 116A-B). Examples disclosed herein adjust tuning data (e.g., weighted minutes) of tuning events to enable the computing device 106 and/or the media crediting circuitry 204 to use less processing time and power combining the panel data and the census data because less time is spent parsing through mismatching tuning events. In some examples, the computing device 106 sends the adjusted tuning events to another location and/or device (e.g., a central office, data server, database, etc.) for crediting, measuring, analyzing, manipulating, storing, and/or gathering insights on audience viewing.

The example system 200 illustrated in FIG. 2 includes the example communication interface circuitry 202 to establish a connection with and transmit information between the computing device 106 and the panel and non-panel households 102, 104 FIG. 1 and/or other devices (e.g., households, presentation devices, servers, computing facilities, etc.). In some examples, the system 200 includes the network 108 (e.g., a wired or wireless network) with which the communication interface circuitry 202 can connect to transfer data to/from the computing device 106. In some examples, the communication interface circuitry 202 establishes wired (e.g., USB, etc.) or wireless (e.g., Bluetooth, etc.) connection(s) with input/output device(s) (e.g., keyboard(s), pointer device(s), display screen(s), speaker(s), etc.) and sends signals that the computing device 106 generates (e.g., using processing circuitry (e.g., central processing unit, ASIC, FPGA, etc.)).

The example system 200 illustrated in FIG. 2 includes the example media crediting circuitry 204 to credit, measure, analyze, and/or store the weighted minutes associated with the tuning events. In some examples, the media crediting circuitry 204 can combine panel data, ACR data, and/or alternate monitoring data associated with the tuning events prior to performing measurements on tuning events. For example, the media crediting circuitry 204 can combine panel data (e.g., demographic, station genre, and daypart) collected from the metering device 114 of FIG. 1 with census data (e.g., weighted minutes from the first and/or second ACR circuitry 118, 120) corresponding to the same tuning event (e.g., tuning events with corresponding labels or identifications). The example media crediting circuitry 204 can provide insights to third-party institutions (e.g., network providers, content creators, advertisement firms) regarding audience engagement with advertisements or content of the tuning event.

The example system 200 illustrated in FIG. 2 includes the example storage device(s) 206 to store adjusted/unadjusted tuning events as well as tuning data (e.g., weighted minutes, station genre, metadata, etc.) used to determine the adjustment factors. The example storage device(s) 206 can include the example non-volatile memory 208 (e.g., flash memory, solid-state drives, read-only memory, etc.), the example volatile memory 210 (e.g., dynamic random access memory, static random access memory, etc.), and, in some examples, mass storage device(s) (e.g., tape libraries, RAID systems, holographic memory, computer drives, etc.). In the example system 200 of FIG. 2 includes the example bus 212 to communicatively couple processing circuitry (e.g., the data adjustment circuitry 214 and/or the media crediting circuitry 204), memory (e.g., the storage device(s) 206, the non-volatile memory 208, and/or the volatile memory 210), and input/output device(s) (e.g., the communication interface circuitry 202) of the computing device 106.

The example system 200 illustrated in FIG. 2 includes the example data adjustment circuitry 214 to determine adjustment factors for different combinations of metadata categories and station groups. The example data adjustment circuitry 214 can also determine which adjustment factor is to be applied to a tuning event and can adjust weighted minutes of tuning events using the corresponding adjustment factor. In some examples, the data adjustment circuitry 214 is instantiated by processor circuitry executing data adjustment instructions and/or configured to perform operations such as those represented by the flowcharts of FIGS. 5-8.

The example data adjustment circuitry 214 illustrated in FIG. 2 includes the example data identification circuitry 216 to identify a combination of metadata categories associated with the weighted minutes obtained from panel data sources (e.g., the metering device 114) and census data sources (e.g., the first and second ACR circuitry 118, 120, the alternate monitoring devices 116A-B, etc.). The example data identification circuitry 216 is also included to detect whether the obtained weighted minutes are associated with live viewing or TSV. In some examples, the data identification circuitry 216 is instantiated by processor circuitry executing data identification instructions and/or configured to perform operations such as those represented by the flowcharts of FIGS. 5-6. In some examples, the data identification circuitry 216 can parse through metadata of the weighted minutes and recognize whether the weighted minutes are labeled as live viewing or time-shifted viewing (TSV). For example, when the data collection source is an alternate monitoring device, and content was viewed substantially simultaneously as the content was aired, then the example alternate monitoring device (e.g., alternate monitoring device(s) 116A-B) labels the alternate monitoring weighted minutes as live viewing. In response to the example data identification circuitry 216 detecting that the weighted minutes are live viewing, the data identification circuitry 216 can tag the weighted minutes to be used for determining an adjustment factor corresponding to live viewing. In some examples, the data identification circuitry 216 stores weighted minutes in the storage device(s) 206 in memory (e.g., volatile memory 210) allocated for live viewing weighted minutes or TSV weighted minutes depending on the metadata tags. In some examples, the data identification circuitry 216 reads a view start time and a credit start time of the tuning data, determines whether the two occurred substantially simultaneously (e.g., within one second), and labels/stores the tuning data as live viewing or TSV when the view start time and the credit start time occurred substantially simultaneously. As described in further detail below, the example data adjustment circuitry 214 determines adjustment factors differently based on whether the weighted minutes are classified as live viewing or TSV.

The example data adjustment circuitry 214 determines adjustment factors based on weighted minutes collected over a contiguous and configurable timeframe (e.g., one day, one week, one month, etc.). The data identification circuitry 216 can identify the combination of metadata categories that correspond to the weighted minutes collected over the timeframe. For example, first weighted minutes are obtained from a panel data source (e.g., the metering device 114) over the course of a one 24-hour day, and the data identification circuitry 216 identifies a portion of the first weighted minutes with the same daypart (e.g., total day, 8:00 μm to 10:00 pm (Eastern Time), 1:00 am to 05:00 am (Pacific Time), etc.), station genre (e.g., households using television, such as CW Broadcast®, ABC®, CBS®, etc.), and demographic (e.g., Persons 12-17, Females 18-34, Males 55+, Households, etc.). The example data identification circuitry 216 can store the weighted minutes identified as corresponding to that same combination of categories and type of viewing (e.g., live viewing or TSV) in a same location in the storage device(s) 206. In some examples, after the example data identification circuitry 216 identifies and stores the weighted minutes according to a given combination of metadata categories and type of viewing, the weighted minutes can be further processed to determine three adjustment factors for live viewing minutes associated with that combination of metadata categories and/or four adjustment factors for TSV minutes associated with that combination of metadata categories.

In some examples, the data identification circuitry 216 determines whether weighted minutes obtained from presentation device(s) (e.g., first and/or second ACR devices 110, 112) correspond to panel weighted minutes or census weighted minutes. As mentioned previously, the adjustment factors can be determined for a total population area or a footprint region of the population area. In some examples, the data identification circuitry 216 obtains/identifies the census weighted minutes to be used in the adjustment factor calculation from panel and/or non-panel households 102, 104 in the total population area. In some examples, the data identification circuitry 216 obtains/identifies the census weighted minutes to be used in the adjustment factor calculation from panel and/or non-panel households 102, 104 in the footprint region (e.g., the panel households in a county, city, state, region, etc.). In some examples, the data identification circuitry 216 obtains/identifies the panel weighted minutes to be used in the adjustment factor calculation from panel households 102 in the total population area.

The example data adjustment circuitry 214 illustrated in FIG. 2 includes the example data categorization circuitry 218 to categorize the stored weighted minutes into station groups based on types of devices that monitor stations using ACR. In some examples, the data categorization circuitry 218 is instantiated by processor circuitry executing data categorization instructions and/or configured to perform operations such as those represented by the flowchart of FIG. 6. In response to the example data identification circuitry 216 identifying the weighted minutes to be used in the adjustment factor calculation based on the combination of metadata categories of the weighted minutes, the example data categorization circuitry 218 categorizes the stored weighted minutes into station groups. As previously mentioned, the example station groups can include three station groups for live viewing or four station groups for TSV. The example station groups for live viewing weighted minutes can be the first station group (e.g., the first and second ACR devices 110, 112 are restricted to monitor the station using ACR), the second station group (e.g., the first ACR device 110 is unrestricted, and the second ACR device 112 is restricted), or the third station group (e.g., the second ACR device 112 is unrestricted, and the first ACR device 110 is restricted). The first station group for live viewing can be further specified based on whether the station genre corresponds to households using television (HUT) stations or non-households using television (non-HUT) stations. Examples of HUT stations include ABC®, Telefutura Broadcast®, CBS®, Independent Broadcast®, etc. An example of a non-HUT station includes streaming services, typically tagged with station code "5005."

The example station groups for TSV weighted minutes can be the first, second, or third station groups or the fourth station group (e.g., the first and second ACR devices 110, 112 are unrestricted to monitor the station using ACR). The fourth station group is included when the ACR devices being used to determine the adjustment factor are both unrestricted from monitoring the same stations via ACR. The example fourth station group is included for TSV adjustment factors because the ACR devices can only store media reference data for a limited time (e.g., 36 hours to 168 hours). Thus, most ACR data for the fourth station group is not collected. Therefore, it is assumed that ACR data is missing for TSV weighted minutes corresponding to the fourth station group because when those stations are accessed after the retention period, no ACR data is collected. Thus, tuning events with stations corresponding to the fourth station group are adjusted to account for the majority of viewings of those stations, which occur after the retention period.

In some examples, the weighted minutes corresponding to a combination of metadata categories is not sufficient to determine an adjustment factor. For example, the weighted minutes of a combination of metadata categories and the first station group may include a number of weighted minutes collected from the first type of device that does not satisfy a threshold (e.g., 1000 weighted minutes) to determine an initial adjustment factor. In such examples, the data categorization circuitry 218 can collapse one or more combinations of categories to combine weighted minutes and satisfy the threshold. For example, when the number of weighted minutes does not satisfy the threshold, the data categorization circuitry 218 can combine and/or collapse weighted minutes from multiple dayparts into a broader "total day" daypart. When the number of weighted minutes still does not satisfy the threshold after the daypart collapsing, then the example data categorization circuitry 218 can further combine the weighted minutes of multiple demographics into a broader demographic, such as Persons 2-17, Females 18-54, Females, 55+, Males 18-54, Males 55+, Females 18+, Males 18+, or Persons 2+. When the number of weighted minutes still does not satisfy the threshold after the daypart and the demographic collapsing, then the example data categorization circuitry 218 can further combine the weighted minutes of multiple station genres into a broader station genre, such as Kids, Sports, Spanish Language, Non-HUT, Olympics, or another collapsed affiliate genre.

The example data adjustment circuitry 214 illustrated in FIG. 2 includes the example data partitioning circuitry 220 to partition and/or separate the stored weighted minutes into device groups based on types of devices that collected the weighted minutes used in the adjustment factor calculation. In some examples, the data partitioning circuitry 220 is instantiated by processor circuitry executing data partitioning instructions and/or configured to perform operations such as those represented by the flowchart of FIG. 6. In response to the data categorization circuitry 218 grouping the stored weighted minutes into station groups, the example data partitioning circuitry 220 can further divide the weighted minutes into device groups based on the types of devices that collected the weighted minutes. In some examples, the device groups include a restricted device group, an unrestricted device group, and/or an alternate monitoring device group. The example restricted device group includes panel weighted minutes collected via the metering device 114 connected to ACR devices (e.g., the first and/or second ACR device(s) 110, 112) that cannot monitor the associated station group via ACR. The example unrestricted device group includes panel weighted minutes collected via the metering device 114 connected to ACR devices (e.g., the first and/or second ACR device(s) 110, 112) that can monitor the associated station group via ACR. The example alternate monitoring device group includes weighted minutes collected via an alternate monitoring device 116A-B (e.g., an RPD device such as a set-top-box) connected to an ACR device (e.g., the first and/or second ACR device(s) 110, 112) or a non-ACR device (e.g., a non-smart TV). In some examples, alternate monitoring data is only collected for live viewing and, as such, alternate monitoring device groups are not included in adjustment factor calculations for TSV. The sum of the weighted minutes from the three device groups equals total weighted minutes used in the adjustment factor calculation. In some examples, the categorized and partitioned weighted minutes can be structured into table(s) of weighted minutes of the same combination of metadata categories. In some examples, the table(s) include(s) rows of station groups and columns of device groups. The example tables structured by the data partitioning circuitry 220 are described in detail below in reference to FIGS. 3 and 4.

The example data adjustment circuitry 214 illustrated in FIG. 2 includes the example adjustment factor determination circuitry 222 to determine an initial adjustment factor based on panel weighted minutes corresponding to the station groups and the device groups. The adjustment factor determination circuitry 222 can also determine a final adjustment factor based on the initial adjustment factor and a bias correction factor. In some examples, the adjustment factor determination circuitry 222 is instantiated by processor circuitry executing adjustment factor determination instructions and/or configured to perform operations such as those represented by the flowcharts of FIGS. 6-8. The example adjustment factor determination circuitry 222 calculates the initial adjustment factor differently based on whether the table of weighted minutes corresponds to live viewing or TSV. The initial adjustment factor for a station group is determined as a ratio of the total panel weighted minutes to a denominator that includes a portion of the panel weighted minutes. For live viewing, the example adjustment factor determination circuitry 222 determines the denominator based on a sum of panel weighted minutes from the unrestricted device group and the alternate monitoring device group. For TSV, the example adjustment factor determination circuitry 222 determines the denominator based on the unrestricted device group or a portion of the unrestricted device group for the fourth station group (described below in reference to FIG. 4). The initial adjustment factor is meant to be greater than or equal to one and is a factor intended to adjust the census data to be proportional to the panel data of the station group. In some examples, when the denominator is determined to equal zero, the adjustment factor determination circuitry 222 sets the initial adjustment factor equal to one. In some examples, when the total first weighted minutes equals zero, the data categorization circuitry 218 collapses the weighted minutes as mentioned previously.

Unlike live viewing, panel weighted minutes collected from alternate monitoring devices (e.g., alternate monitoring devices 116A-B) are not used in the TSV initial adjustment factor calculation. For ACR devices to credit media, the ACR devices use reference data of media that is retained for a limited time (e.g., 36-168 hours) after the media has aired. Since reference data is not always available at the time media is accessed, ACR devices may not credit media even if those ACR devices have unrestricted access to monitor the corresponding stations. Thus, the example data partitioning circuitry 220 does not separate TSV weighted minutes into an alternate monitoring device group, and the adjustment factor determination circuitry 222 does not include the alternate monitoring device group in the initial adjustment factor calculation.

If the initial adjustment factor alone was applied to the weighted minutes of a tuning event, the adjusted tuning event would overstate the audience because the initial adjustment factor is determined assuming that all associated ACR devices do not credit media and/or do not obtain weighted minutes for media/stations of the corresponding station group. However, some of those ACR devices are in panel households 102 and actually do credit the media and/or obtain those weighted minutes via panel sources such as the metering device 114. Therefore, the initial adjustment factor is modified to account for inherent bias that exists due to the panel weighted minutes collected by some restricted ACR devices via metering devices.

The example data adjustment circuitry 214 illustrated in FIG. 2 includes the example bias correction factor determination circuitry 224 to determine a bias correction factor for a station group based on the panel and census weighted minutes obtained from restricted device groups in a footprint region of interest via metering devices and/or alternate monitoring devices. In some examples, the bias correction factor determination circuitry 224 is instantiated by processor circuitry executing bias correction factor determination instructions and/or configured to perform operations such as those represented by the flowchart of FIG. 6. The example bias correction factor determination circuitry 224 identifies the panel and census weighted minutes that were collected from restricted devices in a footprint region of interest. Since the panel weighted minutes used in the initial adjustment factor calculation may correspond to the total population area, the bias correction factor determination circuitry 224 obtains panel and census weighted minutes from restricted device groups in a footprint region of interest ("restricted device group in region") that may be a portion of the panel weighted minutes in the restricted device group mentioned previously. As used herein, the bias correction factor is described as being determined for a footprint region of the population area, but the bias correction factor can also be determined for the total population area.

The example bias correction factor determination circuitry 224 also determines total panel and census weighted minutes corresponding to the station group and the footprint region ("total minutes in region"). In some examples, the total minutes in region is a sum of the panel and census weighted minutes obtained from metering devices, ACR devices, and alternate monitoring devices in the footprint region. As mentioned previously in line with the bias correction factor, in some examples, the total panel and census weighted minutes can also be determined for a total population area. The example bias correction factor circuitry 224 can determine the bias correction factor for each station group corresponding to the combination of metadata categories by dividing the restricted device group in region by the total minutes in region and subtracting from one. The resulting bias correction factor is a percentage (e.g., 0.99, 0.95, etc.) that the adjustment factor determination circuitry 222 applies to (e.g., combined with, multiplied by, etc.) the initial adjustment factor to determine the final adjustment factor.

The example data adjustment circuitry 214 illustrated in FIG. 2 includes the example tuning event adjustment circuitry 226 to adjust ACR data of a tuning event using the final adjustment factor that corresponds to the same combination of metadata categories and station group as the tuning event. In some examples, the tuning event adjustment circuitry 226 is instantiated by processor circuitry executing tuning event adjustment instructions and/or configured to perform operations such as those represented by the flowchart of FIG. 5. In some examples, the communication interface circuitry 202 receives a tuning event to be adjusted from a presentation device. In other examples, the media crediting circuitry 204 identifies a combination of the panel and census weighted minutes corresponding to the same device and the same timestamp and generates a tuning event based on panel data and census obtained. The example tuning event adjustment circuitry 226 can obtain the tuning event to be adjusted and identify the combination of metadata categories and the station group corresponding to the tuning event.

In some examples, tuning events are obtained over a given period of time and the final adjustment factors are updated regularly to maintain an accurate representation of audience viewing behaviors. In some examples, the tuning event adjustment circuitry 226 applies the final adjustment factor to each tuning event obtained over the time period. In response to identifying the combination of metadata categories and the station group corresponding to the tuning event, the example tuning event adjustment circuitry 226 calls the final adjustment factor from the storage devices(s) 206 with the same combination of metadata categories and station group. The example tuning event adjustment circuitry 226 can then multiply the final adjustment factor by the ACR data of the tuning event and send the adjusted tuning event to the media crediting circuitry 204 or to another audience measurement computing system for further analysis, measurement, and/or processing.

FIG. 3 is an illustration of an example live viewing table 300 that shows how the example data adjustment circuitry 214 of FIG. 2 structures data and/or calculates the initial adjustment factor, the bias correction factor, and the final adjustment factor for live viewing as described previously. The example live viewing table 300 is segmented into an example live metadata portion 302, an example live initial factor portion 304, and an example live final factor portion 306. As shown in FIG. 3, the three portions 302, 304, 306 share common rows. For example, the top row of the live viewing table 300 include cells of data corresponding to the first station group. As mentioned previously, although first, second, and third station groups are represented in the example live viewing table 300, there may be more (e.g., four, seven, etc.) or fewer (e.g., two) station groups included in the live viewing table 300 based on the number of types of ACR devices (e.g., Vizio®, Roku®, Samsung®, LG®, etc.) that are included in the panel, are to be accounted for in credited tuning events, and/or are restricted/unrestricted from the different stations.

FIG. 4 is an illustration of an example time-shifted viewing (TSV) table 400 that shows how the example data adjustment circuitry 214 of FIG. 2 structures data and/or calculates the initial adjustment factor, the bias correction factor, and the final adjustment factor for TSV described previously. The example TSV table 400 is segmented into an example TSV metadata portion 402, an example TSV initial factor portion 404, and an example TSV final factor portion 406. As shown in FIG. 4, the three portions 402, 404, 406 share common rows. For example, the top row of the live viewing table 400 include cells of data corresponding to the first station group. As mentioned previously, although first, second, and third station groups are represented in the example TSV table 400, there may be more (e.g., four, seven, etc.) or fewer (e.g., two) station groups included in the TSV table 400 based on the number of types of ACR devices (e.g., Vizio®, Roku®, Samsung®, LG®, etc.) that are included in the panel, are to be accounted for in credited tuning events, and/or are restricted/unrestricted from the different stations.

The example live viewing and TSV tables 300, 400 are included herein to provide visual representations of the data structures and calculations previously described. The live viewing and TSV metadata portions 302, 402 illustrate how the example data categorization circuitry 218 of FIG. 2 organizes the panel and census weighted minutes into different station groups and combinations of metadata categories. In some examples, panel and census weighted minutes are obtained over a configurable and contiguous time period for determining three adjustment factors applicable to the three station groups and the combination of metadata categories. The live metadata portion 302 illustrates that the weighted minutes used in the live viewing example use case correspond to a “Households” demographic, a “101” genre, and a “Total Day” daypart. The TSV metadata portion 402 illustrates that the weighted minutes used in the TSV example use case correspond to the “Household” demographic, the “101” genre, and a “8p-11p” daypart. In some examples, the example live viewing and TSV tables 300, 400 correspond to other combinations of metadata categories.

The live viewing and TSV initial factor portions 304, 404 illustrate how the example data partitioning circuitry 220 organizes the panel and census weighted minutes into device groups and how the adjustment factor determination circuitry 222 calculates the initial adjustment factors. The example “Total Minutes” column includes the total panel weighted minutes obtained from the panel households (e.g., panel households 102) in the total population area over the contiguous time period. The example “Restricted Device Group” column includes panel weighted minutes obtained from restricted ACR devices (e.g., the first and/or second ACR devices 110, 112) via the metering device(s) 114 and/or the alternate monitoring device(s) 116A-B (e.g., RPD devices such as set-top-boxes). As mentioned previously, the restricted ACR devices cannot collect ACR data via ACR circuitry (e.g., the first ACR circuitry 118) for stations of the corresponding station group. As shown in FIG. 4, the “Restricted Device Group” for the fourth station group includes non-zero weighted minutes even though the ACR devices being examined are unrestricted. However, as mentioned previously, it is assumed that no ACR data is collected for those stations because the reference data relied upon by the ACR devices to credit the accessed media expires, is discarded, and/or is unusable after a retention period (e.g., 36-168 hours). Thus, it can be assumed that the ACR devices corresponding to “Restricted Device Group” do not collect any ACR data for the stations in the fourth station group.

The “Unrestricted Device Group” column includes panel weighted minutes obtained from unrestricted ACR devices (e.g., first ACR device(s) 110) via the metering device(s) 114 and/or the first ACR circuitry 118. The “Alternate Monitoring Device Group” column includes panel weighted minutes collected from panel households via the alternate monitoring devices 116A-B (e.g., RPD device(s) such as set-top-boxes). The “Denominator” column includes the panel weighted minutes to be used in the denominator of the initial adjustment factor equation, and the “Initial Factor” column represents the “Total Minutes” column divided by the “Denominator” column.

The live viewing and TSV final factor portions 306, 406 illustrate how the example bias correction factor circuitry 224 calculates the bias correction factor and how the adjustment factor determination circuitry 224 calculates the final adjustment factor. For the example live viewing and TSV tables 300, 400 of FIGS. 3 and 4, the bias correction factor and the final adjustment factor correspond to an example footprint region of interest, which is ten percent of the total population area that the panel represents. The example “Total Minutes in Region” column includes the total panel and census weighted minutes obtained from ACR devices and/or non-ACR devices in panel and non-panel households in the footprint region of interest. The example “Restricted Device Group” column includes panel and/or census weighted minutes obtained from restricted ACR devices (e.g., via metering device(s)/circuitry, RPD device(s), survey device(s)/circuitry, etc.) in panel households of the footprint region. Thus, the “Restricted Device Group in Region” column represents ten percent of the panel weighted minutes in the “Restricted Device Group” column because the footprint region of interest for this particular adjustment factor determination is ten percent of the total population area. The “Bias Correction Factor” column includes output determinations from the example bias correction factor circuitry 224 based on the difference between one and a ratio of the “Restricted Device Group in Region” column to the “Total Minutes in Region” column. The “Final Adjustment Factor” column includes output determinations from the example adjustment factor determination circuitry 222 based on the product of the “Initial Factor” column and the “Bias Correction Factor” column.

In some examples, the computing device 106 includes means for identifying panel and census weighted minutes obtained by the computing device 106 as live viewing or TSV. For example, the means for identifying may be implemented by data identification circuitry 216. In some examples, the data identification circuitry 216 may be instantiated by processor circuitry such as the example processor circuitry 912 of FIG. 9. For instance, the data identification circuitry 216 may be instantiated by the example microprocessor 1000 of FIG. 10 executing machine executable instructions such as those implemented by at least blocks 502 and 508 of FIG. 5, 614 of FIG. 6, and 704 of FIG. 7. In some examples, the data identification circuitry 216 may be instantiated by hardware logic circuitry, which may be implemented by an ASIC, XPU, or the FPGA circuitry 1100 of FIG. 11 structured to perform operations corresponding to the machine readable instructions. Additionally or alternatively, the data identification circuitry 216 may be instantiated by any other combination of hardware, software, and/or firmware. For example, the data identification circuitry 216 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the computing device 106 includes means for categorizing panel weighted minutes into station groups based on the types of devices that can monitor the stations using ACR. For example, the means for categorizing may be implemented by data categorization circuitry 218. In some examples, the data categorization circuitry 218 may be instantiated by processor circuitry such as the example processor circuitry 912 of FIG. 9. For instance, the data categorization circuitry 218 may be instantiated by the example microprocessor 1000 of FIG. 12 executing machine executable instructions such as those implemented by at least blocks 602 and 604 of FIG. 6. In some examples, the data categorization circuitry 218 may be instantiated by hardware logic circuitry, which may be implemented by an ASIC, XPU, or the FPGA circuitry 1100 of FIG. 11 structured to perform operations corresponding to the machine readable instructions. Additionally or alternatively, the data categorization circuitry 218 may be instantiated by any other combination of hardware, software, and/or firmware. For example, the data identification circuitry 216 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the computing device 106 includes means for partitioning panel weighted minutes into device groups based on the types of devices that collected the panel weighted minutes. For example, the means for partitioning may be implemented by data partitioning circuitry 220. In some examples, the data partitioning circuitry 220 may be instantiated by processor circuitry such as the example processor circuitry 912 of FIG. 9. For instance, the data partitioning circuitry 220 may be instantiated by the example microprocessor 1000 of FIG. 10 executing machine executable instructions such as those implemented by at least blocks 606 of FIG. 6. In some examples, the data partitioning circuitry 220 may be instantiated by hardware logic circuitry, which may be implemented by an ASIC, XPU, or the FPGA circuitry 1100 of FIG. 11 structured to perform operations corresponding to the machine readable instructions. Additionally or alternatively, the data partitioning circuitry 220 may be instantiated by any other combination of hardware, software, and/or firmware. For example, the data partitioning circuitry 220 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the computing device 106 includes means for determining initial adjustment factors for station groups associated with live viewing or TSV panel weighted minutes. For example, the means for determining may be implemented by adjustment factor determination circuitry 222. In some examples, the data partitioning circuitry 220 may be instantiated by processor circuitry such as the example processor circuitry 912 of FIG. 9. For instance, the adjustment factor determination circuitry 222 may be instantiated by the example microprocessor 1000 of FIG. 10 executing machine executable instructions such as those implemented by at least blocks 506 of FIGS. 5, 608-610 and 620 of FIGS. 6, 702 and 706-714 of FIG. 7, 802-814 of FIG. 8. In some examples, the adjustment factor determination circuitry 222 may be instantiated by hardware logic circuitry, which may be implemented by an ASIC, XPU, or the FPGA circuitry 1100 of FIG. 11 structured to perform operations corresponding to the machine readable instructions. Additionally or alternatively, the adjustment factor determination circuitry 222 may be instantiated by any other combination of hardware, software, and/or firmware. For example, the adjustment factor determination circuitry 222 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for determining includes means for determining final adjustment factors for station groups based on the initial adjustment factors and the bias correction factors associated with the station groups. For example, the means for determining may be implemented by adjustment factor determination circuitry 222. In some examples, the adjustment factor determination circuitry 222 may be instantiated by processor circuitry such as the example processor circuitry 912 of FIG. 9. For instance, the adjustment factor determination circuitry 222 may be instantiated by the example microprocessor 1000 of FIG. 10 executing machine executable instructions such as those implemented by at least blocks 618 of FIG. 6. In some examples, the adjustment factor determination circuitry 222 may be instantiated by hardware logic circuitry, which may be implemented by an ASIC, XPU, or the FPGA circuitry 1100 of FIG. 11 structured to perform operations corresponding to the machine readable instructions. Additionally or alternatively, the adjustment factor determination circuitry 222 may be instantiated by any other combination of hardware, software, and/or firmware. For example, the adjustment factor determination circuitry 222 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the computing device 106 includes means for determining bias correction factors for station groups associated with live viewing or TSV panel/census weighted minutes. For example, the means for determining may be implemented by bias correction factor determination circuitry 224. In some examples, the bias correction factor determination circuitry 224 may be instantiated by processor circuitry such as the example processor circuitry 912 of FIG. 9. For instance, the bias correction factor determination circuitry 224 may be instantiated by the example microprocessor 1000 of FIG. 10 executing machine executable instructions such as those implemented by at least blocks 616 of FIG. 6. In some examples, the bias correction factor determination circuitry 224 may be instantiated by hardware logic circuitry, which may be implemented by an ASIC, XPU, or the FPGA circuitry 1100 of FIG. 11 structured to perform operations corresponding to the machine readable instructions. Additionally or alternatively, the bias correction factor determination circuitry 224 may be instantiated by any other combination of hardware, software, and/or firmware. For example, the bias correction factor determination circuitry 224 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the computing device 106 includes means for adjusting weighted minutes of tuning events using the final adjustment factor that corresponds to the same combination of metadata categories and station group as the tuning event. For example, the means for adjusting may be implemented by tuning event adjustment circuitry 226. In some examples, the tuning event adjustment circuitry 226 may be instantiated by processor circuitry such as the example processor circuitry 912 of FIG. 9. For instance, the tuning event adjustment circuitry 226 may be instantiated by the example microprocessor 1000 of FIG. 10 executing machine executable instructions such as those implemented by at least blocks 510-514 of FIG. 5. In some examples, the tuning event adjustment circuitry 226 may be instantiated by hardware logic circuitry, which may be implemented by an ASIC, XPU, or the FPGA circuitry 1100 of FIG. 11 structured to perform operations corresponding to the machine readable instructions. Additionally or alternatively, the tuning event adjustment circuitry 226 may be instantiated by any other combination of hardware, software, and/or firmware. For example, the tuning event adjustment circuitry 226 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the computing device 106 of FIG. 1 is illustrated in FIG. 2, one or more of the elements, processes, and/or devices illustrated in FIG. 2 may be combined, divided, re-arranged, omitted, eliminated, and/or implemented in any other way. Further, the example data identification circuitry 216, the example data categorization circuitry 218, the example data partitioning circuitry 220, the example adjustment factor determination circuitry 222, the example bias correction factor determination circuitry 224, the example tuning event adjustment circuitry 226, and/or, more generally, the example computing device 106 of FIG. 1, may be implemented by hardware alone or by hardware in combination with software and/or firmware. Thus, for example, any of the example data identification circuitry 216, the example data categorization circuitry 218, the example data partitioning circuitry 220, the example adjustment factor determination circuitry 222, the example bias correction factor determination circuitry 224, the example tuning event adjustment circuitry 226, and/or, more generally, the example computing device 106, could be implemented by processor circuitry, analog circuit (s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example computing device 106 of FIG. 1 may include one or more elements, processes, and/or devices in addition to, or instead of, those illustrated in FIG. 2, and/or may include more than one of any or all of the illustrated elements, processes and devices.

Flowcharts representative of example machine readable instructions, which may be executed to configure processor circuitry to implement the computing device 106 of FIGS. 1 and 2, are shown in FIGS. 5-8. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 5-8, many other methods of implementing the example computing device 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 5-8 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 5:
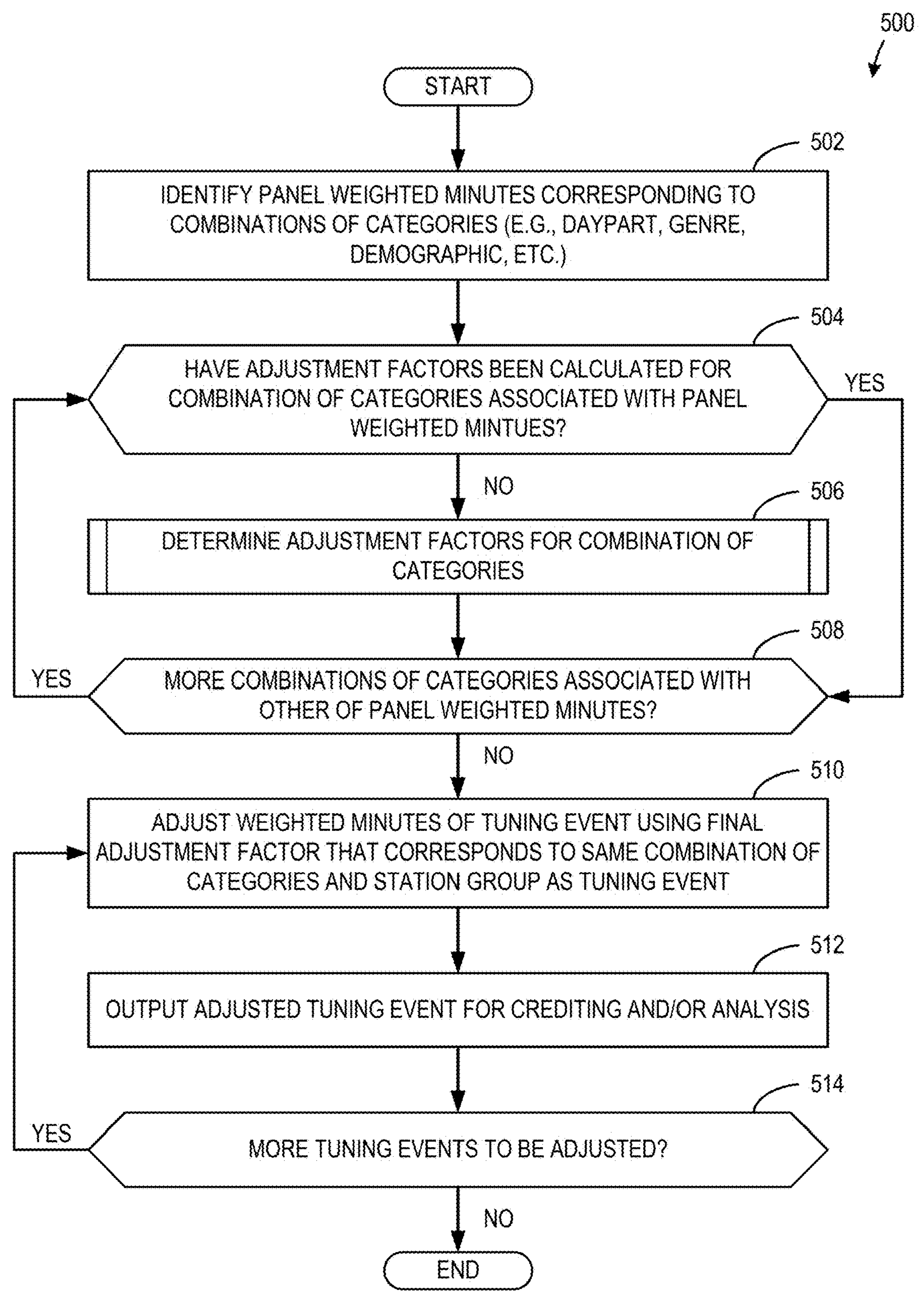
FIGS. 5-8 are flowcharts representative of example machine readable instructions and/or example operations that may be executed by example processor circuitry to implement a computing device of FIG. 2.

FIG. 5 is a flowchart representative of example machine readable instructions and/or example operations 500 that may be executed and/or instantiated by the data adjustment circuitry 214 of FIG. 2 to determine adjustment factors for a combination of categories and apply the adjustment factor to weighted minutes of tuning events with a station group and a combination of metadata categories corresponding to the adjustment factor. The machine readable instructions and/or the operations 500 of FIG. 5 begin at block 502, at which the computing device 106 identifies the panel weighted minutes obtained from panel sources (e.g., metering device 114) and/or alternate monitoring device(s) (e.g., alternate monitoring devices 116A-B) and that correspond to a combination of metadata categories (e.g., daypart, genre, demographic, etc.). For example, the data identification circuitry 216 obtains panel weighted minutes from the communication interface circuitry 202 and reads metadata fields included with the panel weighted minutes. In some examples, the data identification circuitry 216 structures and/or organizes the panel and/or census weighted minutes into tables (e.g., live viewing table 300, TSV table 400, etc.) based on corresponding combination of metadata categories.

At block 504, the computing device 106 determines whether final adjustment factors have been calculated for the combination of metadata categories (e.g., combination of metadata categories such as demographic, genre, daypart categories, etc.) associated with the panel weighted minutes. For example, the adjustment factor determination circuitry 222 determines a combination of metadata categories associated with the panel weighted minutes and calls the storage device(s) 206 for a final adjustment factor corresponding to the combination of metadata categories. When the final adjustment factors return null values or were calculated within a timeframe that does not satisfy a current adjustment factor threshold, then the instructions and/or operations 500 proceed to block 506 where the adjustment factor determination circuitry 222 determines adjustment factors for the combination of metadata categories. Further details of block 506 are described below in reference to instructions and/or operations 600 of FIG. 6. When the adjustment factors corresponding to the combination of metadata categories return non-null values and were calculated within a timeframe that satisfies a current adjustment factor threshold, then the instructions and/or operations 500 proceed to block 508.

At block 508, the computing device 106 determines whether there are more combinations of categories associated with other panel weighted minutes obtained by the computing device 106. For example, the data identification circuitry 216 formulates other potential combinations of metadata categories and cross references each combination of metadata categories with the final adjustment factors saved in the storage device(s) 206. When the data identification circuitry 216 determines that there are one or more combinations of categories that do not correspond to one or more of the stored final adjustment factors, then the example instructions and/or operations 500 proceed to block 504. When the data identification circuitry 216 determines that each combination of metadata categories corresponds to one or more stored adjustment factor, then the example instructions and/or operations 500 proceed to block 510.

At block 510, the computing device 106 adjusts weighted minutes of a tuning event with a final adjustment factor that corresponds to the same combination of metadata categories and station group as the tuning event. For example, the tuning event adjustment circuitry 226 obtains an unadjusted tuning event from the communication interface circuitry 202 or the media crediting circuitry 204 and reads the combination of metadata categories and the station group associated with the tuning event. In some examples, the tuning event adjustment circuitry 226 calls the final adjustment factor corresponding to the combination of metadata categories and the station group of the tuning event from the storage device(s) 206. The tuning event adjustment circuitry 226 then multiplies the final adjustment factor by the weighted minutes of the tuning event.

At block 512, the computing device 106 outputs the adjusted tuning event for crediting, analysis, measurement, and/or further processing. For example, the tuning event adjustment circuitry 226 sends the adjusted tuning event to the media crediting circuitry 204 to be credited to particular media for the adjusted duration (e.g., weighted minutes) and/or to a third party audience measurement computing system such as another back office computing facility, server, supercomputing device, etc. to be analyzed/examined for audience viewing behaviors.

At block 514, the computing device 106 determines whether there are more tuning events to be adjusted with a final adjustment factor. For example, the tuning event adjustment circuitry 226 calls for unadjusted tuning events from the storage device(s) 206 (e.g., the non-volatile memory 208 or the volatile memory 210), the communication interface circuitry 202, and/or the media crediting circuitry 204. When the tuning event adjustment circuitry 226 obtains more tuning events to be adjusted, the example instructions and/or operations 500 return to block 510. When the tuning event adjustment circuitry 226 determines that there are no more tuning events to be adjusted, then the example instructions and/or operations 500 end.

Figure 6:
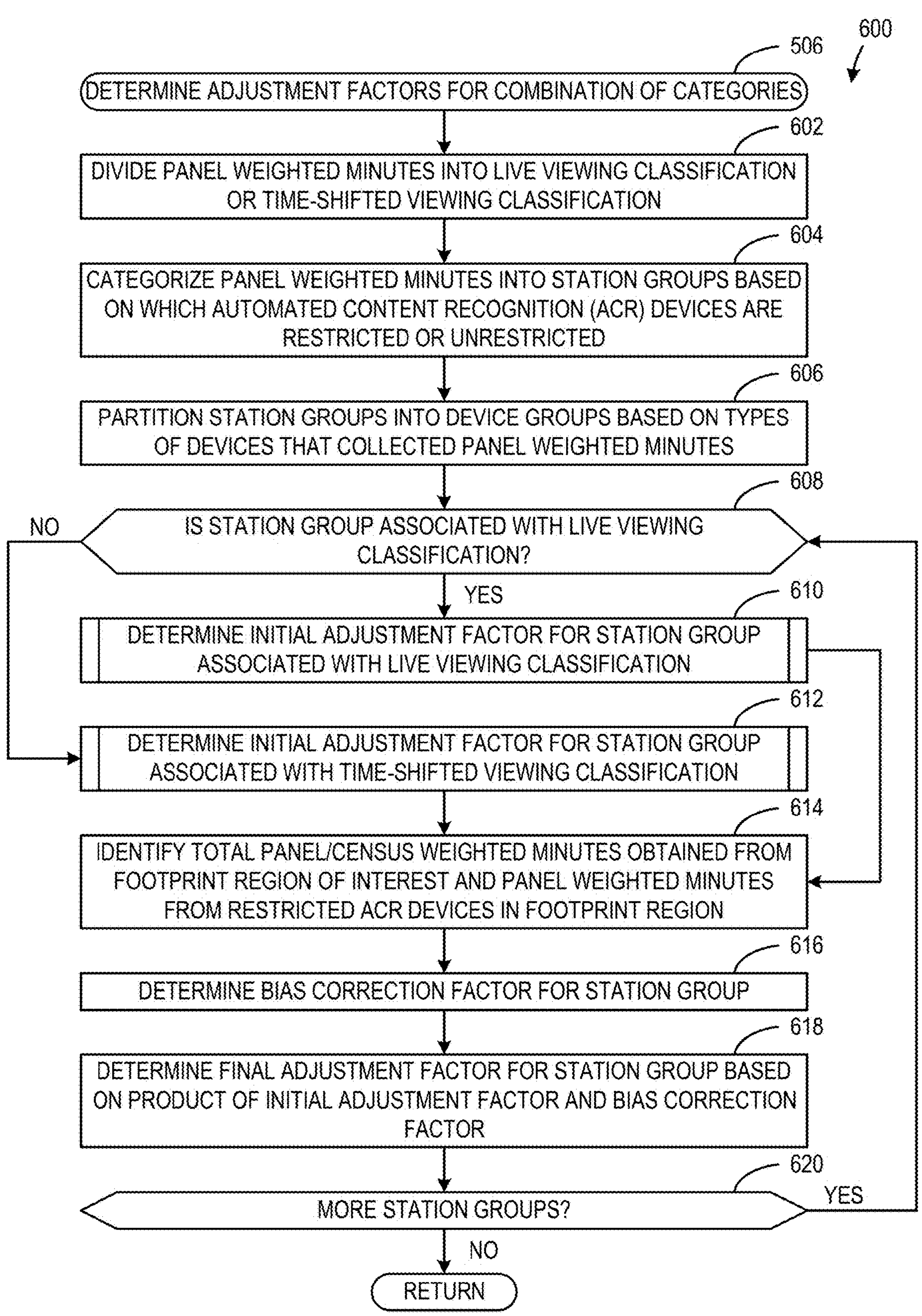

FIG. 6 is a flowchart representative of example machine readable instructions and/or example operations 600 that may be executed and/or instantiated by the example data adjustment circuitry 214 to implement the adjustment factor determination circuitry 222 to determine initial and final adjustment factors for a combination of metadata categories. The machine readable instructions and/or the operations 600 of FIG. 6 begin at block 602, at which the computing device 106 divides the panel weighted minutes into a live viewing classification or a time-shifted viewing classification. For example, the data categorization circuitry 218 reads viewing type labels of the panel weighted minutes. When the viewing type label returns as live viewing, the data categorization circuitry 218 organizes/structures the live viewing minutes into a live viewing data structure (e.g., the live viewing table 300). When the viewing type label returns as time-shifted viewing, the data organization circuitry 218 organizes/structures the TSV minutes into a TSV data structure (e.g., the TSV table 400).

At block 604, the computing device 106 categorizes the panel weighted minutes into station groups based on the stations associated with the panel weighted minutes and based on which ACR devices are restricted or unrestricted from monitoring the associated stations via ACR. For example, the data categorization circuitry 216 organizes/structures the panel weighted into row(s) in the live viewing and/or TSV tables 300, 400 based on the stations of the panel weighted minutes and based on which ACR devices are restricted/unrestricted. When the ACR devices (e.g., the first and second ACR devices 110, 112) used in the adjustment factor determination cannot monitor the station via ACR, then the data categorization circuitry 216 organizes the associated panel weighted minutes into the first station group. When a first one of the ACR devices (e.g., the first ACR device 110) can monitor the station via ACR, but the other ACR device(s) (e.g., the second ACR device 112) cannot, then the data categorization circuitry 216 organizes the associated panel weighted minutes into the second station group. When a second one of the ACR devices (e.g., the second ACR device 112) can monitor the station via ACR, but the other ACR device(s) (e.g., the first ACR device 110) cannot, then the data categorization circuitry 216 organizes the associated panel weighted minutes into the third station group. When the all/both of the ACR devices (e.g., the first and second ACR devices 110, 112) can monitor the station via ACR, then the data categorization circuitry 216 organizes the associated panel weighted minutes into the fourth station group (e.g., in the TSV table 400). As mentioned previously, there can be more than three station groups in the live viewing table 300 or more than four station groups in the TSV table 400 when there are more than two ACR devices from which the panel/census weighted minutes are obtained and that are used in the adjustment factor determination.

At block 606, the computing device 106 partitions the panel weighted minutes into device groups (e.g., restricted device group, unrestricted device group, alternate monitoring device group, etc.) based on the devices from which the panel weighted minutes were obtained. For example, the data partitioning circuitry 218 separates the rows station groups in the live viewing and/or TSV tables 300, 400 into columns of device groups. In some examples, the panel weighted minutes include metadata tags or handles that indicate the devices that collected/measured the panel weighted minutes.

At block 608, the computing device 106 determines whether the panel weighted minutes of the station group are associated with the live viewing classification. For example, the adjustment factor determination circuitry 222 reads a metadata tag, handle, and/or label generated by the data categorization circuitry 218 that indicates whether the panel weighted minutes are associated with live viewing or TSV. When the example adjustment factor determination circuitry 222 determines that the panel weighted minutes in the station group correspond to live viewing, then the instructions and/or operations 600 proceed block 610. When the example adjustment factor determination circuitry 222 determines that the panel weighted minutes in the station group correspond to TSV, then the instructions and/or operations 600 proceed block 612.

At block 610, the computing device 106 determines the initial adjustment factor for the station group associated with the live viewing classification. For example, when the adjustment factor determination circuitry 222 determines that the panel weighted minutes of the station group are classified as live viewing, the adjustment factor determination circuitry 222 calculates the ratio of the total panel weighted minutes (e.g., the "Total Minutes" column of the live viewing table 300) to the panel weighted minutes of the unrestricted and alternate monitoring device groups (e.g., the sum of the "Unrestricted Device Group" column and the "alternate monitoring Device Group" column of table 300). Further details of block 610 are described below in reference to instructions and/or operations 700 of FIG. 7.

At block 612, the computing device 106 determines the initial adjustment factor for the station group associated with the TSV classification. For example, when the adjustment factor determination circuitry 222 determines that the panel weighted minutes of the station group are classified as TSV, the adjustment factor determination circuitry 222 calculates the ratio of the total panel weighted minutes (e.g., the "Total Minutes" column of the TSV table 400) to the panel weighted minutes of the unrestricted device group (e.g., the "Unrestricted Device Group" column of the TSV table 400). Further details of block 612 are described below in reference to instructions and/or operations 800 of FIG. 8.

At block 614, the computing device 106 identifies total panel and census weighted minutes obtained (e.g., via metering devices, ACR circuitry, alternate monitoring devices/circuitry, etc.) from a footprint region of interest and identifies panel weighted minutes obtained from restricted ACR devices (e.g., the first ACR device(s) 110) in the footprint region. For example, the data identification circuitry 216 obtains the panel and/or census weighted minutes from the communication interface circuitry 202 and detects a device type indicator and a regional location indicator (e.g., a designated market area (DMA)) from which the panel and/or census weighted minutes were collected. In some examples, the data identification circuitry 216, the data categorization circuitry 218, and/or the data partitioning circuitry 220 structures these panel and/or census weighted minutes in the "Restricted Device Group in Region" and the "Total Minutes in Region" columns of the live viewing and TSV final factor portions 306, 406.

At block 616, the computing device 106 determines the bias correction factor for the station group. For example, the bias correction factor determination circuitry 224 performs bias correction factor calculations on the panel and/or census weighted minutes corresponding to the footprint region. In some examples, the bias correction factor determination circuitry 224 performs bias correction factor calculations for the total population area. As mentioned previously, the bias correction factor circuitry 224 determines a portion of the panel weighted minutes corresponding to the station group and the restricted device group that were obtained from in the footprint region or the total population area. The bias correction factor circuitry 224 determines a ratio of that portion of the panel weighted minutes to the total sum of panel and census weighted minutes collected via metering device(s), ACR circuitry, and/or alternate monitoring device(s)/circuitry in the footprint region or total population area. The bias correction factor circuitry 224 subtracts the ratio from one to determine the bias correction factor for the associated station group.

At block 618, the computing device 106 determines the final adjustment factor for the station group based on a product of the initial adjustment factor and the bias correction factor. For example, the adjustment factor determination circuitry 222 calls the initial adjustment factor and the bias correction factor that correspond to the same combination of metadata categories and station group. The adjustment factor determination circuitry 222 can then multiply the initial factor by the bias correction factor to determine the final adjustment factor for the combination of metadata categories and the station group.

At block 620, the computing device 106 determines whether there are more station groups associated with the combination of metadata categories for which a final adjustment factor has not been determined. For example, the adjustment factor determination circuitry 222 calls the station groups and the final adjustment factor(s) corresponding to the combination of metadata categories from the storage device(s) 206 and determines whether each station group is associated with a final adjustment factor that was calculated within a timeframe that satisfies the current adjustment factor threshold. When the adjustment factor determination circuitry 222 determines that there are more station groups in the combination of metadata categories for which a final adjustment factor is to be determined, then the instructions and/or operations 600 proceed to block 608. When the adjustment factor determination circuitry 222 determines that a final adjustment factor has been calculated for each station group of the combination of metadata categories, then the instructions and/or operations 600 return to block 508 of FIG. 5.

Figure 7:
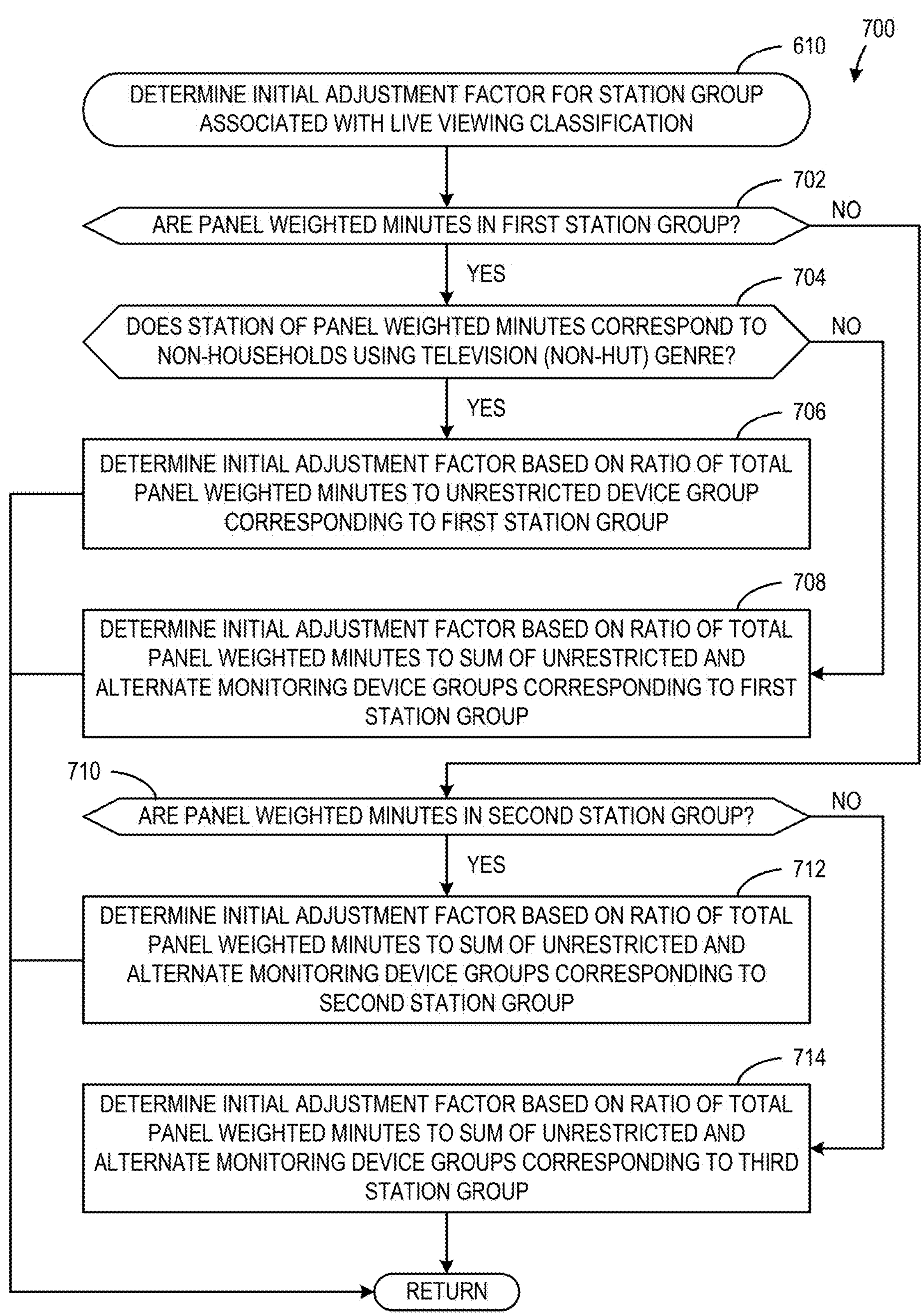

FIG. 7 is a flowchart representative of example machine readable instructions and/or example operations 700 that may be executed and/or instantiated by the adjustment factor determination circuitry 222 to determine an initial adjustment factor for a station group (e.g., the first, second, third station groups, etc.) associated with the live viewing classification. The machine readable instructions and/or the operations 700 of FIG. 7 begin at block 702, at which the computing device 106 determines whether the panel weighted minutes being used to determine the initial adjustment factor correspond to the first station group. For example, the adjustment factor determination circuitry 222 determines whether the panel weighed minutes include a first station group indicator and/or are stored in the first station group row of the example live viewing table 300. When the adjustment factor determination circuitry 222 determines that the panel weighted minutes are not in the first station group, then the instructions and/or operations 700 proceed to block 710.

When the adjustment factor determination circuitry 222 determines that the panel weighted minutes are in the first station group, then the instructions and/or operations 700 proceed to block 704 where the computing device 106 determines whether the station of the panel weighted minutes corresponds to a non-household using television (non-HUT) station genre. For example, the data identification circuitry 216 can call the station genre metadata tag corresponding to the panel weighted minutes and determine whether the station code matches a non-HUT station code (e.g., "5005 Streaming"). When the data identification circuitry 216 determines that the station of the panel weighted minutes does correspond to a non-HUT station genre, the instructions and/or operations proceed to block 706 where the computing device 106 determines the initial adjustment factor for a non-HUT substation group of the first station group. For example, the adjustment factor determination circuitry 222 calculates the initial adjustment factor based on a ratio of the total panel weighted minutes corresponding to the first station group to the panel weighted minutes of the unrestricted device group corresponding to the first station group.

When the adjustment factor determination circuitry 222 determines that the station of the panel weighted minutes does not correspond to a non-HUT station genre, then the instructions and/or operations proceed to block 708 where the computing device 106 determines the initial adjustment factor for the first station group. For example, the adjustment factor determination circuitry 222 calculates the initial adjustment factor based on a ratio of the total panel weighted minutes corresponding to the first station group to a sum of the panel weighted minutes of the unrestricted and the alternate monitoring device groups corresponding to the first station group.

When the adjustment factor determination circuitry 222 determines that the panel weighted minutes are not in the first station group, then the instructions and/or operations 700 proceed to block 710 where the computing device 106 determines whether the panel weighted minutes correspond to the second station group. For example, the adjustment factor determination circuitry 222 determines whether the panel weighed minutes include a second station group indicator and/or are stored in the second station group row of the example live viewing table 300. When the adjustment factor determination circuitry 222 determines that the panel weighted minutes are not in the second station group, then the instructions and/or operations 700 proceed to block 714.

When the adjustment factor determination circuitry 222 determines that the panel weighted minutes are in the second station group, then the instructions and/or operations proceed to block 712 where the computing device 106 determines the initial adjustment factor for the second station group. For example, the adjustment factor determination circuitry 222 calculates the initial adjustment factor based on a ratio of the total panel weighted minutes corresponding to the second station group to a sum of the panel weighted minutes of the unrestricted and the alternate monitoring device groups corresponding to the second station group.

When the adjustment factor determination circuitry 222 determines that the portion of the first weighted minutes is not in the second station group, then the instruction and/or operations 700 proceed to block 714 where the computing device 106 determines the initial adjustment factor for the third station group. For example, the adjustment factor determination circuitry 222 calculates the initial adjustment factor based on a ratio of the total panel weighted minutes corresponding to the third station group to a sum of the panel weighted minutes of the unrestricted and the alternate monitoring device groups corresponding to the third station group. The example instructions and/or operations 700 then return to block 614 of FIG. 6.

Figure 8:
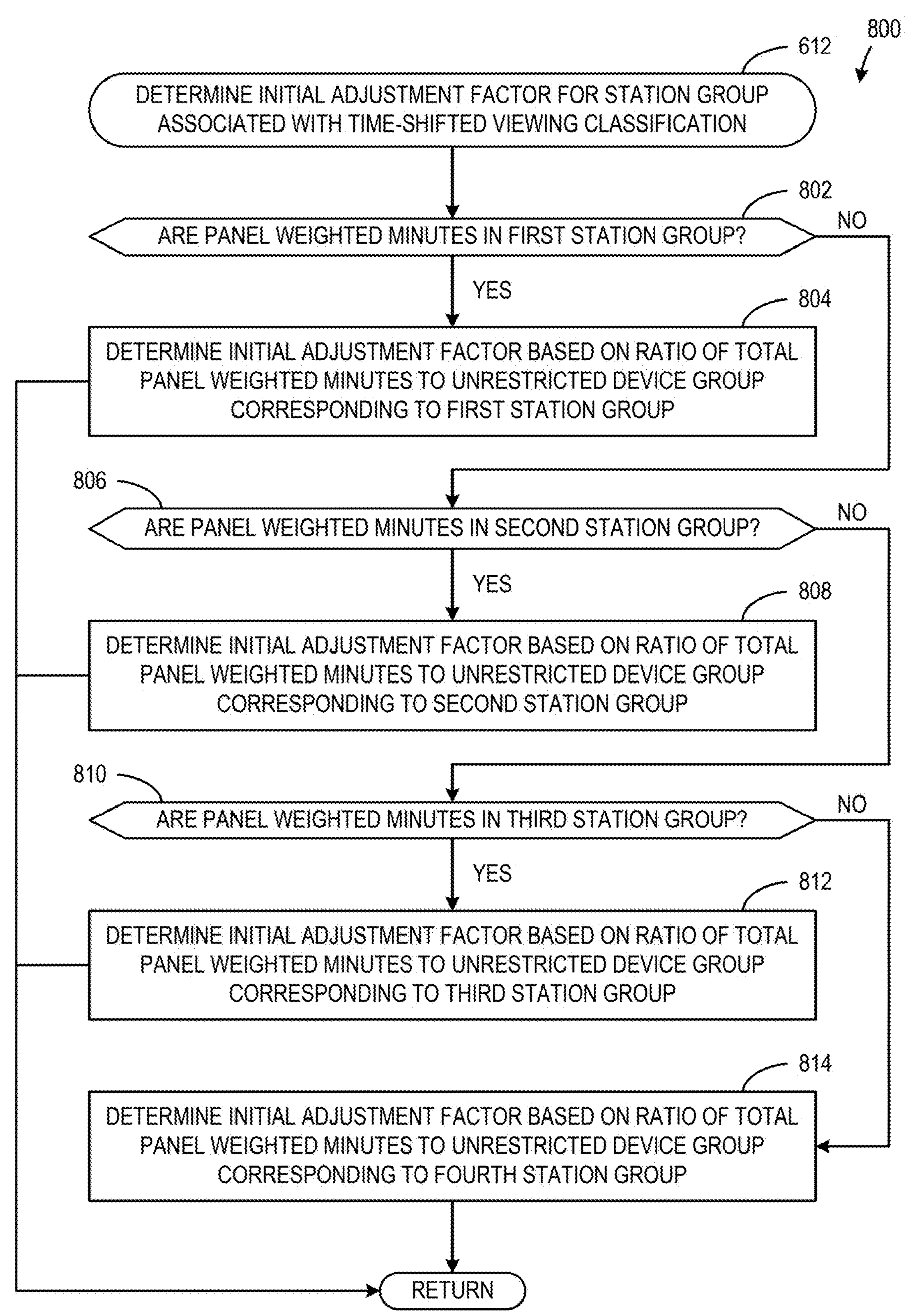

FIG. 8 is a flowchart representative of example machine readable instructions and/or example operations 800 that may be executed and/or instantiated by the adjustment factor determination circuitry 222 to determine an initial adjustment factor for a station group (e.g., the first, second, third, fourth station groups, etc.) associated with the TSV classification. The machine readable instructions and/or the operations 800 of FIG. 8 begin at block 802, at which the computing device 106 determines whether the panel weighted minutes being used to determine the initial adjustment factor correspond to the first station group. For example, the adjustment factor determination circuitry 222 determines whether the panel weighed minutes include a first station group indicator and/or are stored in the first station group row of the example TSV table 400. When the adjustment factor determination circuitry 222 determines that the panel weighted minutes are not in the first station group, then the instructions and/or operations 800 proceed to block 806.

When the adjustment factor determination circuitry 222 determines that the panel weighted minutes are in the first station group, then the instructions and/or operations 800 proceed to block 804 where the computing device 106 determines the initial adjustment factor for the first station group. For example, the adjustment factor determination circuitry 222 calculates the initial adjustment factor based on a ratio of the total panel weighted minutes corresponding to the first station group to the panel weighted minutes of the unrestricted device group corresponding to the first station group.

When the adjustment factor determination circuitry 222 determines that the panel weighted minutes are not in the first station group, then the instructions and/or operations 800 proceed to block 806 where the computing device 106 determines whether the panel weighted minutes correspond to the second station group. For example, the adjustment factor determination circuitry 222 determines whether the panel weighed minutes include a second station group indicator and/or are stored in the second station group row of the example TSV table 400. When the adjustment factor determination circuitry 222 determines that the panel weighted minutes are not in the second station group, then the instructions and/or operations 800 proceed to block 810.

When the adjustment factor determination circuitry 222 determines that the panel weighted minutes are in the second station group, then the instructions and/or operations 800 proceed to block 808 where the computing device 106 determines the initial adjustment factor for the second station group. For example, the adjustment factor determination circuitry 222 calculates the initial adjustment factor based on a ratio of the total panel weighted minutes corresponding to the second station group to the panel weighted minutes of the unrestricted device group corresponding to the second station group.

When the adjustment factor determination circuitry 222 determines that the portion of the first weighted minutes are not in the second station group, then the instruction and/or operations 800 proceed to block 810 where the computing device 106 determines whether the panel weighted minutes are in the third station group. For example, the adjustment factor determination circuitry 222 determines whether the panel weighed minutes include a third station group indicator and/or are stored in the third station group row of the example TSV table 400. When the adjustment factor determination circuitry 222 determines that the panel weighted minutes are not in the third station group, then the instructions and/or operations 800 proceed to block 814.

When the adjustment factor determination circuitry 222 determines that the panel weighted minutes are in the third station group, then the instructions and/or operations 800 proceed to block 812 where the computing device 106 determines the initial adjustment factor for the third station group. For example, the adjustment factor determination circuitry 222 calculates the initial adjustment factor based on a ratio of the total panel weighted minutes corresponding to the third station group to the panel weighted minutes of the unrestricted device group corresponding to the third station group.

When the adjustment factor determination circuitry 222 determines that the panel weighted minutes are not in the third station group, then the instructions and/or operations 800 proceed to block 814 where the computing device 106 determines the initial adjustment factor for the fourth station group. For example, the adjustment factor determination circuitry 222 calculates the initial adjustment factor based on a ratio of the total panel weighted minutes corresponding to the fourth station group to the panel weighted minutes of the unrestricted device group corresponding to the fourth station group. The example instructions and/or operations 800 then return to block 614 of FIG. 6.

Figure 9:
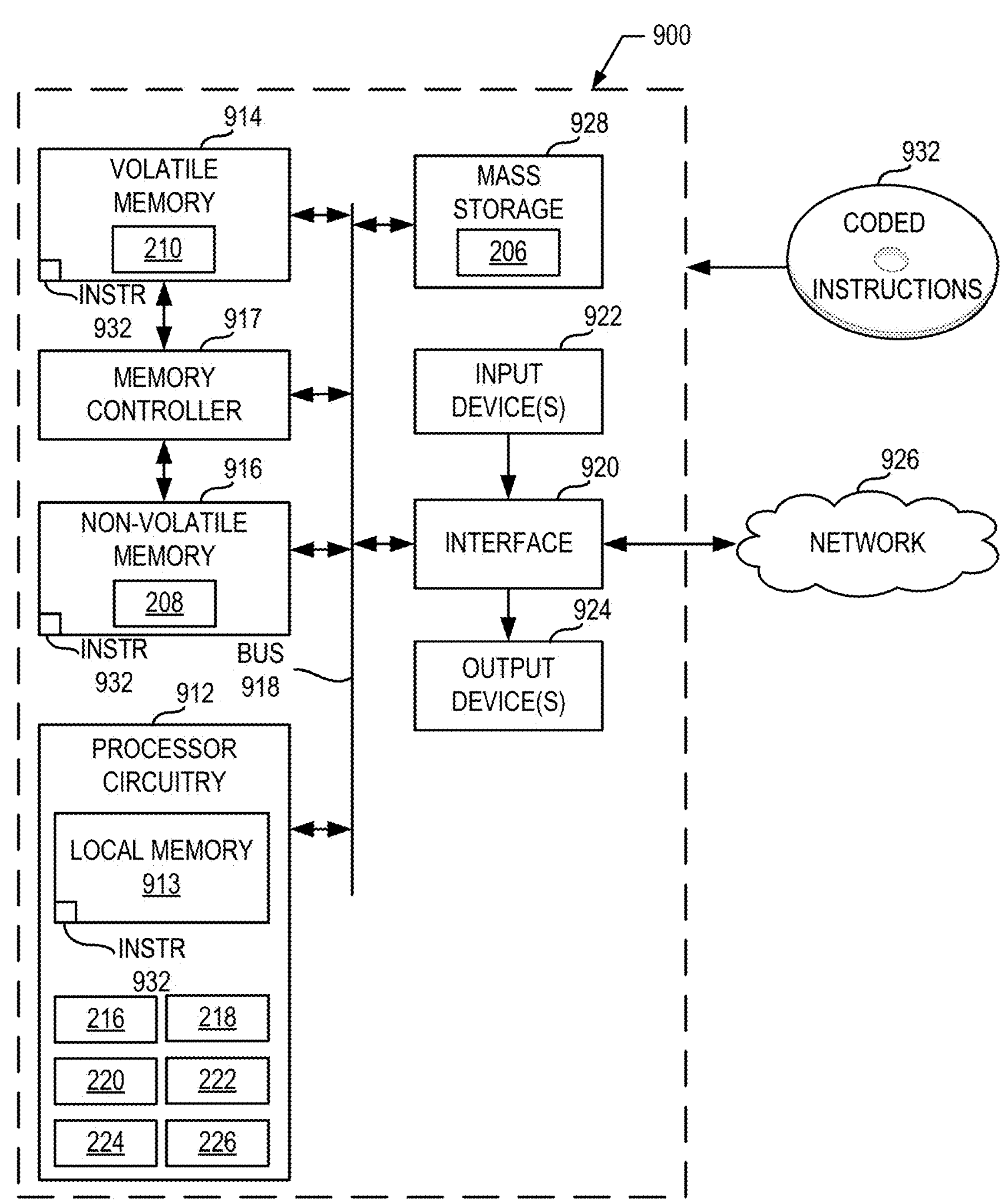
FIG. 9 is a block diagram of an example processing platform including processor circuitry structured to execute the example machine readable instructions and/or the example operations of FIGS. 5-8 to implement the computing device of FIG. 2.

FIG. 9 is a block diagram of an example processor platform 900 structured to execute and/or instantiate the machine readable instructions and/or the operations of FIGS. 5-8 to implement the computing device 106 of FIG. 1. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs, microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements example data identification circuitry 216, the example data categorization circuitry 218, the example data partitioning circuitry 220, the example adjustment factor determination circuitry 222, the example bias correction factor determination circuitry 224, the example tuning event adjustment circuitry 226, and/or, more generally, the example computing device 106.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 932, which may be implemented by the machine readable instructions of FIGS. 5-8, may be stored in the mass storage device 928, in the volatile memory 914, in the non-volatile memory 916, and/or on a removable non-transitory computer readable storage medium such as a CD or DVD.

Figure 10:
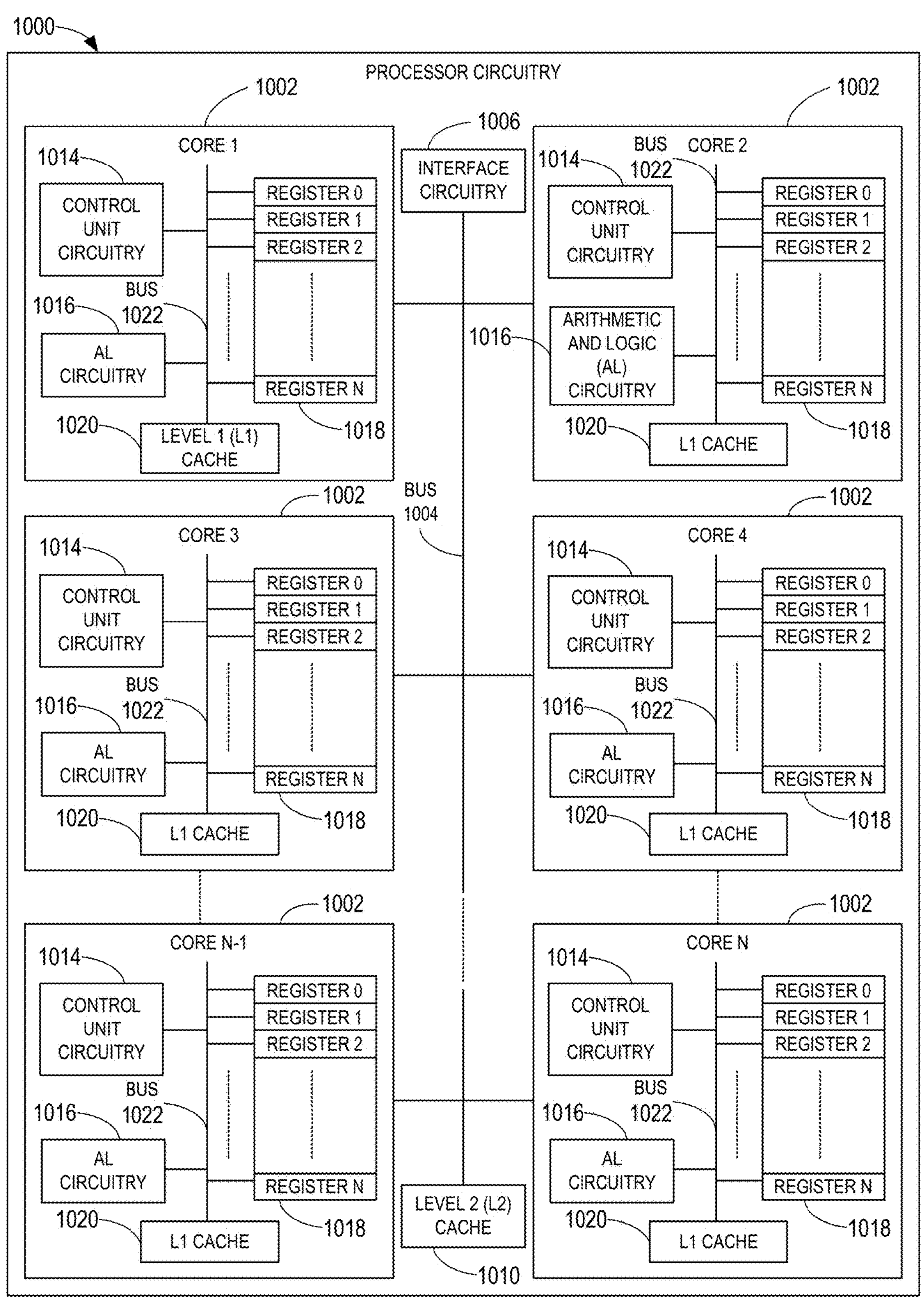
FIG. 10 is a block diagram of an example implementation of the processor circuitry of FIG. 9.

FIG. 10 is a block diagram of an example implementation of the processor circuitry 912 of FIG. 9. In this example, the processor circuitry 912 of FIG. 9 is implemented by a microprocessor 1000. For example, the microprocessor 1000 may be a general purpose microprocessor (e.g., general purpose microprocessor circuitry). The microprocessor 1000 executes some or all of the machine readable instructions of the flowcharts of FIGS. 5-8 to effectively instantiate the data adjustment circuitry 214 of FIG. 2 as logic circuits to perform the operations corresponding to those machine readable instructions. In some such examples, the data adjustment circuitry 214 of FIG. 2 is instantiated by the hardware circuits of the microprocessor 1000 in combination with the instructions. For example, the microprocessor 1000 may be implemented by multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowcharts of FIGS. 5-8.

The cores 1002 may communicate by a first example bus 1004. In some examples, the first bus 1004 may be implemented by a communication bus to effectuate communication associated with one(s) of the cores 1002. For example, the first bus 1004 may be implemented by at least one of an Inter-Integrated Circuit (I2C) bus, a Serial Peripheral Interface (SPI) bus, a PCI bus, or a PCIe bus. Additionally or alternatively, the first bus 1004 may be implemented by any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2 cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the local memory 1020, and a second example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The second bus 1022 may be implemented by at least one of an I2C bus, a SPI bus, a PCI bus, or a PCIe bus Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 11:
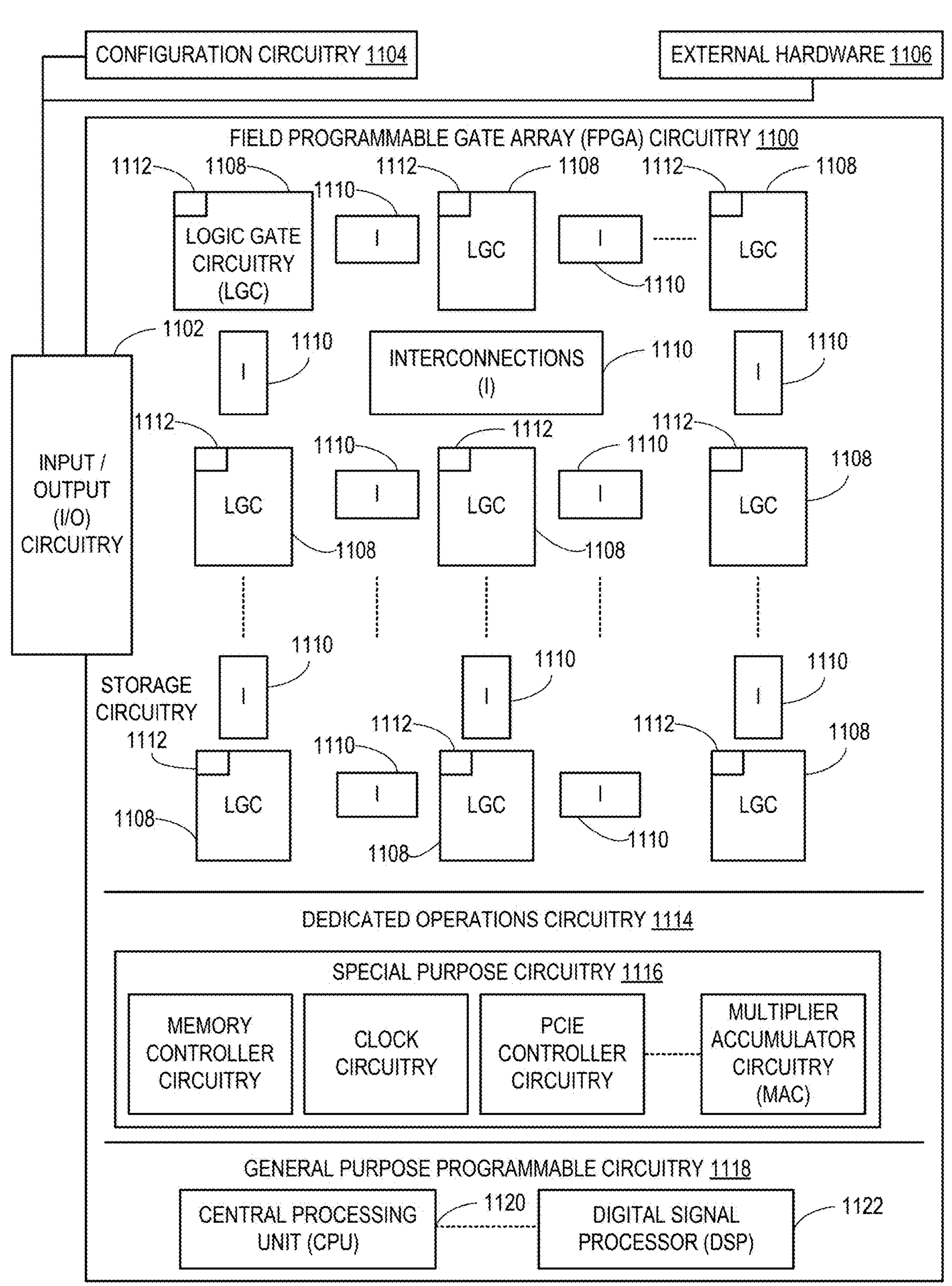
FIG. 11 is a block diagram of another example implementation of the processor circuitry of FIG. 9.

FIG. 11 is a block diagram of another example implementation of the processor circuitry 912 of FIG. 9. In this example, the processor circuitry 912 is implemented by FPGA circuitry 1100. For example, the FPGA circuitry 1100 may be implemented by an FPGA. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the machine readable instructions in hardware and, thus, can often execute the operations faster than they could be performed by a general purpose microprocessor executing the corresponding software.

More specifically, in contrast to the microprocessor 1000 of FIG. 10 described above (which is a general purpose device that may be programmed to execute some or all of the machine readable instructions represented by the flowcharts of FIGS. 5-8 but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine readable instructions represented by the flowcharts of FIGS. 5-8 In particular, the FPGA circuitry 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowcharts of FIGS. 5-8. As such, the FPGA circuitry 1100 may be structured to effectively instantiate some or all of the machine readable instructions of the flowcharts of FIGS. 5-8 as dedicated logic circuits to perform the operations corresponding to those software instructions in a dedicated manner analogous to an ASIC. Therefore, the FPGA circuitry 1100 may perform the operations corresponding to the some or all of the machine readable instructions of FIG. 5-8 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware 1106. For example, the configuration circuitry 1104 may be implemented by interface circuitry that may obtain machine readable instructions to configure the FPGA circuitry 1100, or portion(s) thereof. In some such examples, the configuration circuitry 1104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1106 may be implemented by external hardware circuitry. For example, the external hardware 1106 may be implemented by the microprocessor 1000 of FIG. 10. The FPGA circuitry 1100 also includes an array of example logic gate circuitry 1108, a plurality of example configurable interconnections 1110, and example storage circuitry 1112. The logic gate circuitry 1108 and the configurable interconnections 1110 are configurable to instantiate one or more operations that may correspond to at least some of the machine readable instructions of FIGS. 5-8 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The configurable interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 912 of FIG. 9, many other approaches are contemplated. For example, as mentioned above, modern FPGA circuitry may include an on-board CPU, such as one or more of the example CPU 1120 of FIG. 11. Therefore, the processor circuitry 912 of FIG. 9 may additionally be implemented by combining the example microprocessor 1000 of FIG. 10 and the example FPGA circuitry 1100 of FIG. 11. In some such hybrid examples, a first portion of the machine readable instructions represented by the flowcharts of FIGS. 5-8 may be executed by one or more of the cores 1002 of FIG. 10, a second portion of the machine readable instructions represented by the flowcharts of FIGS. 5-8 may be executed by the FPGA circuitry 1100 of FIG. 11, and/or a third portion of the machine readable instructions represented by the flowcharts of FIGS. 5-8 may be executed by an ASIC. It should be understood that some or all of the data adjustment circuitry 214 of FIG. 2 may, thus, be instantiated at the same or different times. Some or all of the circuitry may be instantiated, for example, in one or more threads executing concurrently and/or in series. Moreover, in some examples, some or all of the data adjustment circuitry 214 of FIG. 2 may be implemented within one or more virtual machines and/or containers executing on the microprocessor.

In some examples, the processor circuitry 912 of FIG. 9 may be in one or more packages. For example, the microprocessor 1000 of FIG. 10 and/or the FPGA circuitry 1100 of FIG. 11 may be in one or more packages. In some examples, an XPU may be implemented by the processor circuitry 912 of FIG. 9, which may be in one or more packages. For example, the XPU may include a CPU in one package, a DSP in another package, a GPU in yet another package, and an FPGA in still yet another package.

Figure 12:
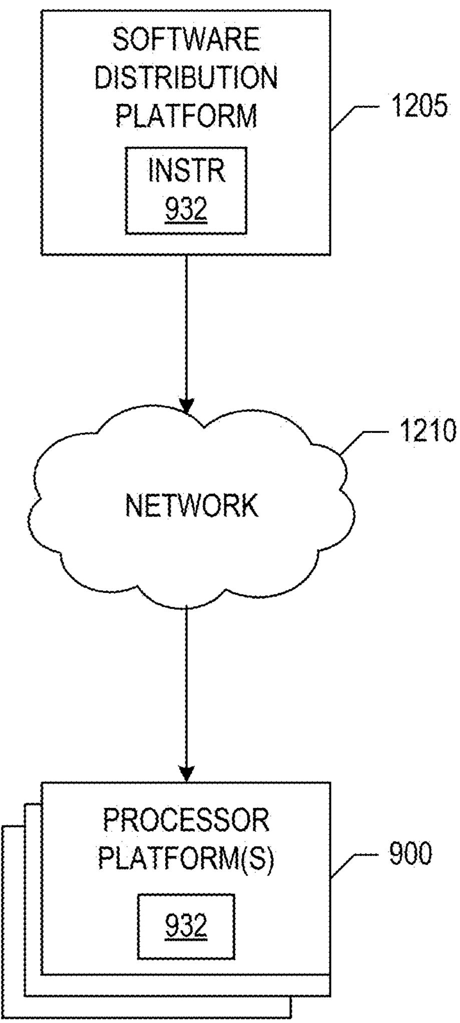
FIG. 12 is a block diagram of an example software distribution platform (e.g., one or more servers) to distribute software (e.g., software corresponding to the example machine readable instructions of FIGS. 5-8) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1205 to distribute software such as the example machine readable instructions 932 of FIG. 9 to hardware devices owned and/or operated by third parties is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform 1205. For example, the entity that owns and/or operates the software distribution platform 1205 may be a developer, a seller, and/or a licensor of software such as the example machine readable instructions 932 of FIG. 9. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the machine readable instructions 932, which may correspond to the example machine readable instructions 500-800 of FIGS. 5-8, as described above. The one or more servers of the example software distribution platform 1205 are in communication with an example network 1210, which may correspond to any one or more of the Internet and/or any of the example networks (e.g., network 108 of FIG. 1) described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 932 from the software distribution platform 1205. For example, the software, which may correspond to the example machine readable instructions 500-800 of FIGS. 5-8, may be downloaded to the example processor platform 900, which is to execute the machine readable instructions 932 to implement the computing device 106 of FIG. 1. In some examples, one or more servers of the software distribution platform 1205 periodically offer, transmit, and/or force updates to the software (e.g., the example machine readable instructions 932 of FIG. 9) to ensure improvements, patches, updates, etc., are distributed and applied to the software at the end user devices.

Example methods, apparatus, systems, and articles of manufacture to adjust tuning events are disclosed herein. Further examples and combinations thereof include the following:

Example 1 includes an apparatus to adjust a tuning event comprising interface circuitry to obtain panel data and census data, and processor circuitry including one or more of at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations, or Application Specific Integrated Circuitry (ASIC) including logic gate circuitry to perform one or more third operations, the processor circuitry to perform at least one of the first operations, the second operations, or the third operations to instantiate adjustment factor determination circuitry to determine an initial adjustment factor for a group of stations and a combination of metadata categories associated with the panel data and the census data, and determine a final adjustment factor for the group of stations based on the initial adjustment factor and a bias correction factor, and tuning event adjustment circuitry to adjust weighted minutes of the tuning event based on the final adjustment factor, the tuning event corresponding to the group of stations and the combination of metadata categories, the adjusted tuning event to be credited to media.

Example 2 includes the apparatus of example 1, wherein the processor circuitry is to instantiate data identification circuitry to identify the combination of metadata categories corresponding to the panel data and the census data.

Example 3 includes the apparatus of example 1, wherein the combination of metadata categories includes a daypart, a station genre, and a demographic, the daypart including a portion of time corresponding to the panel data and the census data, the station genre including at least a network provider identification or a station type identification, and the demographic including a descriptor of panel household or panel member.

Example 4 includes the apparatus of example 1, wherein the group of station is a first group of stations, and the processor circuitry is to instantiate data categorization circuitry to organize the panel data and the census data into at least the first group of stations, a second group of stations, and a third group of stations based on whether first automated content recognition (ACR) devices or second ACR devices can monitor the groups of stations using ACR circuitry.

Example 5 includes the apparatus of example 1, wherein the processor circuitry is to instantiate data partitioning circuitry to partition the panel data into at least a restricted device group and an unrestricted device group based on types of devices that collected the panel data, the restricted device group including panel data obtained from first ACR devices that cannot monitor the group of stations using ACR circuitry, and the unrestricted device group including panel data obtained from second ACR devices that can monitor the group of stations using ACR circuitry.

Example 6 includes the apparatus of example 5, wherein the processor circuitry is to instantiate bias correction factor determination circuitry to determine the bias correction factor based on the panel data corresponding to the first ACR devices and the panel and census data corresponding to the second ACR devices.

Example 7 includes the apparatus of example 6, wherein the processor circuitry is to instantiate the adjustment factor determination circuitry to determine the initial adjustment factor based on a ratio of the panel data to a portion of the panel data corresponding to at least the unrestricted device group, and determine the final adjustment factor based on a product of the initial adjustment factor and the bias correction factor.

Example 8 includes an apparatus to adjust a tuning event comprising at least one memory, machine readable instructions, and processor circuitry to at least one of instantiate or execute the machine readable instructions to calculate an initial adjustment factor for a group of stations and a combination of metadata categories associated with panel data and census data, a final adjustment factor for the group of stations based on the initial adjustment factor and a bias correction factor, and modify weighted minutes of the tuning event based on the final adjustment factor, the tuning event corresponding to the group of stations and the combination of metadata categories, the modified tuning event to be credited to media.

Example 9 includes the apparatus of example 8, wherein the processor circuitry is to recognize the combination of metadata categories corresponding to the panel data and the census data.

Example 10 includes the apparatus of example 8, wherein the combination of metadata categories includes a daypart, a station genre, and a demographic, the daypart including a portion of time corresponding to the panel data and the census data, the station genre including at least a network provider identification or a station type identification, and the demographic including a descriptor of panel household or panel member.

Example 11 includes the apparatus of example 8, wherein the group of station is a first group of stations, and the processor circuitry is to categorize the panel data and the census data into at least the first group of stations, a second group of stations, and a third group of stations based on whether first automated content recognition (ACR) devices or second ACR devices can monitor the groups of stations using ACR circuitry.

Example 12 includes the apparatus of example 8, wherein the processor circuitry is to separate the panel data into at least a restricted device group and an unrestricted device group based on types of devices that collected the panel data, the restricted device group including panel data obtained from first ACR devices that cannot monitor the group of stations using ACR circuitry, and the unrestricted device group including panel data obtained from second ACR devices that can monitor the group of stations using ACR circuitry.

Example 13 includes the apparatus of example 12, wherein the processor circuitry is to calculate the bias correction factor based on the panel data corresponding to the first ACR devices and the panel and census data corresponding to the second ACR devices.

Example 14 includes the apparatus of example 13, wherein the processor circuitry is to calculate the initial adjustment factor based on a ratio of the panel data to a portion of the panel data corresponding to at least the unrestricted device group, and calculate the final adjustment factor based on a product of the initial adjustment factor and the bias correction factor.

Example 15 includes a non-transitory machine readable storage medium comprising instructions that, when executed, cause processor circuitry to at least compute an initial adjustment factor for a group of stations and a combination of metadata categories associated with panel data and census data, compute a final adjustment factor for the group of stations based on the initial adjustment factor and a bias correction factor, and increase weighted minutes of a tuning event based on the final adjustment factor, the tuning event corresponding to the group of stations and the combination of metadata categories, the increased tuning event to be credited to media.

Example 16 includes the non-transitory machine readable storage medium of example 15, wherein the instructions cause the processor circuitry to detect the combination of metadata categories corresponding to the panel data and the census data.

Example 17 includes the non-transitory machine readable storage medium of example 15, wherein the combination of metadata categories includes a daypart, a station genre, and a demographic, the daypart including a portion of time corresponding to the panel data and the census data, the station genre including at least a network provider identification or a station type identification, and the demographic including a descriptor of panel household or panel member.

Example 18 includes the non-transitory machine readable storage medium of example 15, wherein the group of station is a first group of stations, and the instructions cause the processor circuitry to categorize the panel data and the census data into at least the first group of stations, a second group of stations, and a third group of stations based on whether first automated content recognition (ACR) devices or second ACR devices can monitor the groups of stations using ACR circuitry.

Example 19 includes the non-transitory machine readable storage medium of example 15, wherein the instructions cause the processor circuitry to divide the panel data into at least a restricted device group and an unrestricted device group based on types of devices that collected the panel data, the restricted device group including panel data obtained from first ACR devices that cannot monitor the group of stations using ACR circuitry, and the unrestricted device group including panel data obtained from second ACR devices that can monitor the group of stations using ACR circuitry.

Example 20 includes the non-transitory machine readable storage medium of example 19, wherein the instructions cause the processor circuitry to compute the bias correction factor based on the panel data corresponding to the first ACR devices and the panel and census data corresponding to the second ACR devices.

Example 21 includes the non-transitory machine readable storage medium of example 20, wherein the instructions cause the processor circuitry to compute the initial adjustment factor based on a ratio of the panel data to a portion of the panel data corresponding to at least the unrestricted device group, and compute the final adjustment factor based on a product of the initial adjustment factor and the bias correction factor.

Example 22 includes a non-transitory machine readable medium comprising adjustment factor determination instructions to cause at least one machine to determine an initial adjustment factor for a group of stations and a combination of metadata categories associated with panel data and census data, and determine a final adjustment factor for the group of stations based on the initial adjustment factor and a bias correction factor, and tuning event adjustment instructions to cause the at least one machine to adjust weighted minutes of the tuning event based on the final adjustment factor, the tuning event corresponding to the group of stations and the combination of metadata categories, the adjusted tuning event to be credited to media.

Example 23 includes the non-transitory machine readable medium of example 22, further including data identification instructions to cause the at least one machine to identify the combination of metadata categories corresponding to the panel data and the census data.

Example 24 includes the non-transitory machine readable medium of example 22, wherein the combination of metadata categories includes a daypart, a station genre, and a demographic, the daypart including a portion of time corresponding to the panel data and the census data, the station genre including at least a network provider identification or a station type identification, and the demographic including a descriptor of panel household or panel member.

Example 25 includes the non-transitory machine readable medium of example 22, wherein the group of station is a first group of stations, further including data categorization instructions to cause the at least one machine to organize the panel data and the census data into at least the first group of stations, a second group of stations, and a third group of stations based on whether first automated content recognition (ACR) devices or second ACR devices can monitor the groups of stations using ACR circuitry.

Example 26 includes the non-transitory machine readable medium of example 22, further including data partitioning instructions to cause the at least one machine to partition the panel data into at least a restricted device group and an unrestricted device group based on types of devices that collected the panel data, the restricted device group including panel data obtained from first ACR devices that cannot monitor the group of stations using ACR circuitry, and the unrestricted device group including panel data obtained from second ACR devices that can monitor the group of stations using ACR circuitry.

Example 27 includes the non-transitory machine readable medium of example 26, further including bias correction factor determination instructions to cause the at least one machine to determine the bias correction factor based on the panel data corresponding to the first ACR devices and the panel and census data corresponding to the second ACR devices.

Example 28 includes the non-transitory machine readable medium of example 27, wherein the adjustment factor determination instructions cause the at least one machine to determine the initial adjustment factor based on a ratio of the panel data to a portion of the panel data corresponding to at least the unrestricted device group, and determine the final adjustment factor based on a product of the initial adjustment factor and the bias correction factor.

Example 29 includes a method for adjusting a tuning event, the method comprising processing an initial adjustment factor for a group of stations and a combination of metadata categories associated with panel data and census data, processing a final adjustment factor for the group of stations based on the initial adjustment factor and a bias correction factor, augmenting weighted minutes of the tuning event based on the final adjustment factor, the tuning event corresponding to the group of stations and the combination of metadata categories, the augmented tuning event to be credited to media.

Example 30 includes the method of example 29, further including associating the combination of metadata categories to the panel data and the census data.

Example 31 includes the method of example 29, wherein the combination of metadata categories includes a daypart, a station genre, and a demographic, the daypart including a portion of time corresponding to the panel data and the census data, the station genre including at least a network provider identification or a station type identification, and the demographic including a descriptor of panel household or panel member.

Example 32 includes the method of example 29, wherein the group of station is a first group of stations, further including categorizing the panel data and the census data into at least the first group of stations, a second group of stations, and a third group of stations based on whether first automated content recognition (ACR) devices or second ACR devices can monitor the groups of stations using ACR circuitry.

Example 33 includes the method of example 29, further including categorizing the panel data into at least a restricted device group and an unrestricted device group based on types of devices that collected the panel data, the restricted device group including panel data obtained from first ACR devices that cannot monitor the group of stations using ACR circuitry, and the unrestricted device group including panel data obtained from second ACR devices that can monitor the group of stations using ACR circuitry.

Example 34 includes the method of example 33, further including processing the bias correction factor based on the panel data corresponding to the first ACR devices and the panel and census data corresponding to the second ACR devices.

Example 35 includes the method of example 34, wherein the processing of the initial adjustment factor is based on a ratio of the panel data to a portion of the panel data corresponding to at least the unrestricted device group, and the processing of the final adjustment factor is based on a product of the initial adjustment factor and the bias correction factor.

From the foregoing, it will be appreciated that example systems, methods, apparatus, and articles of manufacture have been disclosed that adjust tuning events to account for first and/or second types of devices that do not collect ACR data of stations corresponding to the tuning events with a first type of ACR device. Disclosed systems, methods, apparatus, and articles of manufacture improve the efficiency of using a computing device by adjusting (e.g., proportionally increasing) the ACR data of tuning events to be more efficiently combined with the panel data of the tuning events, thereby decreasing the amount of memory allocated to storing tuning events with unrepresentative ACR data that cannot be used for accurate audience measurements, and decreasing the processing time and power spent parsing through unadjusted tuning events that likely result in understated audience viewing measurements. Disclosed systems, methods, apparatus, and articles of manufacture are accordingly directed to one or more improvement(s) in the operation of a machine such as a computer or other electronic and/or mechanical device.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The invention claimed is:

1. A computing system comprising a processor and a memory, the computing system configured to perform a set of acts comprising:

obtaining panel weighted minutes indicative of media consumption in panel households, wherein the panel weighted minutes are collected via metering devices that monitor respective media devices;

identifying a first subset of the panel weighted minutes that are indicative of media consumption via media devices that do not collect automatic content recognition (ACR) data for a television station;

determining an initial adjustment factor based on a total of the panel weighted minutes and a total of the first subset of the panel weighted minutes; and adjusting a combination of panel data and census data for a tuning event on the television station to account for ACR data that is not collected for the television station by the media devices, wherein a portion of the census data is generated based on tuning data from the media devices that do not collect ACR data for the television station.

2. The computing system of claim 1, wherein the set of acts further comprises:

determining a bias correction factor for a region; and determining a final adjustment factor using the initial adjustment factor and the bias correction factor, and wherein adjusting the combination of panel data and census data comprises applying the final adjustment factor to the combination of panel data and census data.

3. The computing system of claim 1, wherein determining the initial adjustment factor comprises determining the initial adjustment factor based on a ratio of: the total of the panel weighted minutes; and a difference between the total of the panel weighted minutes and the total of the first subset of the panel weighted minutes.

4. The computing system of claim 1, wherein:

the panel weighted minutes are indicative of media consumption for a combination of metadata categories, and the initial adjustment factor is specific to the combination of metadata categories.

5. The computing system of claim 4, wherein the combination of metadata categories is a combination of daypart and genre.

6. The computing system of claim 1, wherein the set of acts further comprises outputting the adjusted combination of panel data and census data for use in crediting.

7. The computing system of claim 1, wherein the media devices that do not collect automatic content recognition (ACR) data for a television station are televisions having integrated ACR technology that are not authorized to collect ACR data for the television station.

8. A computer-implemented method comprising:

obtaining panel weighted minutes indicative of media consumption in panel households, wherein the panel weighted minutes are collected via metering devices that monitor respective media devices;

identifying a first subset of the panel weighted minutes that are indicative of media consumption via media devices that do not collect automatic content recognition (ACR) data for a television station;

determining an initial adjustment factor based on a total of the panel weighted minutes and a total of the first subset of the panel weighted minutes; and adjusting a combination of panel data and census data for a tuning event on the television station to account for ACR data that is not collected for the television station by the media devices, wherein a portion of the census data is generated based on tuning data from the media devices that do not collect ACR data for the television station.

9. The computer-implemented method of claim 8, further comprising:

determining a bias correction factor for a region; and determining a final adjustment factor using the initial adjustment factor and the bias correction factor, and wherein adjusting the combination of panel data and census data comprises applying the final adjustment factor to the combination of panel data and census data.

10. The computer-implemented method of claim 8, wherein determining the initial adjustment factor comprises determining the initial adjustment factor based on a ratio of: the total of the panel weighted minutes; and a difference between the total of the panel weighted minutes and the total of the first subset of the panel weighted minutes.

11. The computer-implemented method of claim 8, wherein:

the panel weighted minutes are indicative of media consumption for a combination of metadata categories, and the initial adjustment factor is specific to the combination of metadata categories.

12. The computer-implemented method of claim 11, wherein the combination of metadata categories is a combination of daypart and genre.

13. The computer-implemented method of claim 8, further comprising outputting the adjusted combination of panel data and census data for use in crediting.

14. The computer-implemented method of claim 8, wherein the media devices that do not collect automatic content recognition (ACR) data for a television station are televisions having integrated ACR technology that are not authorized to collect ACR data for the television station.

15. A non-transitory computer-readable medium having stored therein instructions that, when executed by a computing system, cause the computing system to perform a set of acts comprising:

obtaining panel weighted minutes indicative of media consumption in panel households, wherein the panel weighted minutes are collected via metering devices that monitor respective media devices;

identifying a first subset of the panel weighted minutes that are indicative of media consumption via media devices that do not collect automatic content recognition (ACR) data for a television station;

determining an initial adjustment factor based on a total of the panel weighted minutes and a total of the first subset of the panel weighted minutes; and adjusting a combination of panel data and census data for a tuning event on the television station to account for ACR data that is not collected for the television station by the media devices, wherein a portion of the census data is generated based on tuning data from the media devices that do not collect ACR data for the television station.

16. The non-transitory computer-readable medium of claim 15, wherein the set of acts further comprises:

determining a bias correction factor for a region; and determining a final adjustment factor using the initial adjustment factor and the bias correction factor, and wherein adjusting the combination of panel data and census data comprises applying the final adjustment factor to the combination of panel data and census data.

17. The non-transitory computer-readable medium of claim 15, wherein determining the initial adjustment factor comprises determining the initial adjustment factor based on a ratio of: the total of the panel weighted minutes; and a difference between the total of the panel weighted minutes and the total of the first subset of the panel weighted minutes.

18. The non-transitory computer-readable medium of claim 15, wherein:

the panel weighted minutes are indicative of media consumption for a combination of metadata categories, and the initial adjustment factor is specific to the combination of metadata categories.

19. The non-transitory computer-readable medium of claim 18, wherein the combination of metadata categories is a combination of daypart and genre.

20. The non-transitory computer-readable medium of claim 15, wherein the set of acts further comprises outputting the adjusted combination of panel data and census data for use in crediting.

* * * * *